US 7,836,072 B2

(12) United States Patent
Yoneda

(10) Patent No.: US 7,836,072 B2
(45) Date of Patent: Nov. 16, 2010

(54) LIVING BODY GROWTH AND THERAPY PROMOTION CONDITION COLLECTION INFORMATION PROCESSING DEVICE

(75) Inventor: Kenji Yoneda, Kyoto (JP)

(73) Assignee: CCS Inc., Kyoto (JP)

( * ) Notice: Subject to any disclaimer, the term of this patent is extended or adjusted under 35 U.S.C. 154(b) by 342 days.

(21) Appl. No.: 10/529,162

(22) PCT Filed: Sep. 26, 2003

(86) PCT No.: PCT/JP03/12376

§ 371 (c)(1),
(2), (4) Date: Mar. 24, 2005

(87) PCT Pub. No.: WO2004/028240

PCT Pub. Date: Apr. 8, 2004

(65) Prior Publication Data

US 2006/0047700 A1   Mar. 2, 2006

(30) Foreign Application Priority Data

Sep. 26, 2002 (JP) .......................... P2002-280498

(51) Int. Cl.
*G06F 17/30* (2006.01)
*G06F 7/00* (2006.01)
(52) U.S. Cl. ..................... 707/770; 600/310; 705/7; 705/14.19; 707/792; 707/915; 707/942
(58) Field of Classification Search ............. None
See application file for complete search history.

(56) References Cited

U.S. PATENT DOCUMENTS 6,016,038 A * 1/2000 Mueller et al. .............. 315/291

| | | | | |
|---|---|---|---|---|
| 6,177,761 B1 * | 1/2001 | Pelka et al. | | 313/512 |
| 6,577,080 B2 * | 6/2003 | Lys et al. | | 315/362 |
| 6,885,748 B1 * | 4/2005 | Wang | | 380/201 |
| 6,897,624 B2 * | 5/2005 | Lys et al. | | 315/297 |
| 7,112,566 B1 * | 9/2006 | Siegel et al. | | 514/12 |
| 2002/0022772 A1 * | 2/2002 | Dodds | | 600/300 |
| 2002/0091991 A1 * | 7/2002 | Castro | | 717/106 |
| 2003/0028914 A1 * | 2/2003 | Liu et al. | | 800/278 |
| 2003/0131372 A1 * | 7/2003 | Copenhaver et al. | | 800/278 |

FOREIGN PATENT DOCUMENTS

| | | |
|---|---|---|
| JP | 10-178899 | 7/1998 |
| JP | 2000-83477 | 3/2000 |
| JP | 2001-251961 | 9/2001 |
| JP | 2002-101756 | 4/2002 |
| JP | 2002-163416 | 6/2002 |
| JP | 2002-183242 | 6/2002 |
| WO | 01/82147 | 11/2001 |

* cited by examiner

*Primary Examiner*—Greta L Robinson
*Assistant Examiner*—James J Wilcox

(57) ABSTRACT

An information processing system P3 is communicably connected with multiple controlling systems P2 that promote the growth or health of living organisms by controlling at the least the light irradiated on such living organisms by a light irradiating means X1, and the environmental data produced by one controlling system P1 and concerning the beneficial environmental parameters including the light irradiated on the living organisms are transmitted to and administered by the information processing system P3 so that the environmental data from one of the controlling systems P2 is delivered from the information processing system P3 to any of the other controlling systems P2, and royalty data concerning royalties is produced in relationship to a controlling system identifier that uniquely identifies the one controlling system P1 when the information processing system P3 receives or delivers the environmental data.

18 Claims, 30 Drawing Sheets

| ENVIRONMENTAL DATA NAME | CONTROLLING SYSTEM IDENTIFIER | PLANT IDENTIFIER | INFORMATION CONCERINIG PERMISSION TO DISCLOSE SOURCE |
|---|---|---|---|
| e1234.xxx | p658219 | 15p39 (STRAWBERRY) | 1 (CAN BE DISCLOSED) |
| e5981.xxx | y286536 | 27a68 (TULIP) | 1 (CAN BE DISCLOSED) |

LINK WITH ENVIRONMENTAL DATA

FIG.6

| STATE DATA NAME | CONTROLLING SYSTEM IDENTIFIER | PLANT IDENTIFIER | ENVIRONMENTAL DATA NAME |
|---|---|---|---|
| s1234.yyy | p658219 | 15p39 (STRAWBERRY) | e1234.xxx |
| s5981.yyy | y286536 | 27a68 (TULIP) | e5981.xxx |

↑ LINK WITH ENVIRONMENTAL DATA

FIG.7

| ASSESSMENT DATA NAME | UNIQUENESS | EFFECTIVENESS | ENVIRONMENTAL DATA NAME |
|---|---|---|---|
| t1234.zzz | 1 (WITH) | 1 (WITH) | e1234.xxx |
| t5981.zzz | 1 (WITH) | 0 (NO) | e5981.xxx |

LINK WITH ENVIRONMENTAL DATA

FIG.8

| ENVIRONMENTAL DATA NAME | LIGHT EMITTING MODE | IRRADIATED PORTION | IRRADIATION TIME |
|---|---|---|---|
| E3567.xxx | SONATA 1.zzz | FOREHEAD | 20 MINUTES |

FIG.28

| STATE DATA NAME | BRAIN WAVE | BODY TEMPERATURE CHANGE | ... | OBSERVATION | CENESTHESIA |
|---|---|---|---|---|---|
| S3967.yyy | BRAIN WAVE 1.△△△ | BODY TEMPERATURE 1.□□□ | ... | OBSERVATION 1.txt | CENESTHESIA 1.txt |

FIG.29

| CONTROLLING SYSTEM IDENTIFIER | ENVIRONMENTAL DATA NAME | STATE DATA NAME | INFORMATION OF PERMISSION TO DISCLOSE SOURCE |
|---|---|---|---|
| c79034 | E3567.xxx | S3967.yyy | 1 (PERMITTED) |
| t98250 | E2364.xxx | S8465.yyy | 0 (NOT PERMITTED) |

FIG.30

LIVING BODY GROWTH AND THERAPY PROMOTION CONDITION COLLECTION INFORMATION PROCESSING DEVICE

FIELD OF THE ART

This invention relates to an information processing system for collecting and administrating data pertaining to conditions that promote the culture of plants and other biological organisms, and the treatment and alleviation of unwanted symptoms or stress in living organisms, data that pertains to the creation and maintenance of optimum environmental conditions including but not limited to light irradiated upon the living organisms.

BACKGROUND ART

Conventionally, light emitted from artificial light sources such as incandescent lamps, sodium lamps or the like is irradiated upon plants in order to promote their culture. However, it is known that such incandescent lamps or sodium lamps have a number of problems such as inefficient light emission, wasteful energy consumption due to radiation in wavelengths irrelevant to the culture of plants, and excessive production of heat.

However, taking advantage of recently developed LEDs that emit the blue light necessary for plant cultivation with high brightness, it is possible to make LED array light sources that can be freely controlled to provide desired irradiating conditions concerning the color of the light emission, the stroboscopic or sequential pattern of light emission, the light intensity and so on. Furthermore, the possibility of promoting the culture of various plants and the alleviation of unwanted symptoms or stress in living organisms by making use of such LED light sources has been suggested in a number of documents (for example, refer to Japan Patent Publication No. 8-89084) and is attracting attention.

However, since the light irradiating conditions consist of multiple parameters such as the color of the light emission, its pattern, intensity and so on, and since the optimum light irradiating conditions vary according to the kind of plant, too much labor is required for an individual or a single corporation to proprietarily find the large number of required optimum light irradiating conditions. In addition, once an effective light irradiating condition is found after trial and error, if the effect is significantly beneficial, the parameters are usually treated as confidential knowledge. Furthermore, since the dissemination of such knowledge is under the control of the person or company that has expended considerable effort to develop it, there may be cases where the beneficial application of such knowledge to the general public is hindered if not rendered impossible.

Under such circumstances, the potential for the use or improvement of newly discovered techniques concerning the culturing of plants or promotion of beneficial effects in the condition of living organisms, by making use of sophisticated light sources, might be in danger of being inhibited on a large scale.

A desired main objective of the present claimed invention is to smoothly collect and proliferate data concerning the light irradiating conditions that conventionally tend to be kept secret as proprietary knowledge, and then to rapidly promote the development of new illumination conditions that are optimal for the growth and development of plants and animals, and the wellbeing of human beings.

DISCLOURE OF THE INVENTION

In order to solve the above-mentioned problems, the present claimed invention connects individuals desiring to foster plant growth through a communication network, and discloses or transmits environmental data held by such individuals, such as parameters that favor the culturing of particular living organisms, to persons who request such environmental data, conditional upon the receipt of payment of an agreed-upon value amount.

More specifically, this invention consists of an information processing system connected communicably with multiple controlling systems that promote the growth or health of living organisms by controlling at the least the light irradiated on such living organisms by a light irradiating means, and the environmental data produced by one controlling system concerning the beneficial environmental parameters including the irradiated light on the living organism are transmitted to and administered by the information processing system so that the environmental data from that one controlling system can be delivered from the information processing system to any of the other controlling systems, and royalty data concerning royalties is produced in relationship to a controlling system identifier that uniquely identifies the one controlling system when the information processing system receives or delivers the environmental data. "Health" in this specification includes the process of "curing" in its intended meaning, namely, the alleviation of undesirable conditions or symptoms.

In accordance with this embodiment, since royalty fees are paid to a person or enterprise that has discovered or developed effective environmental data, it is possible to collect environmental data such as is used in the culturing of living organisms that conventionally tends to be held in secret, since a profitable return for effort expended can be reasonably expected.

In addition, since the proposed invention provides a sense of security that a royalty of some kind will be paid, a large number participants engaged in the development of such valuable environmental data can be attracted, and rapid development can be expected even though this type of environmental data has a large number of parameters and requires significant work to perfect. The administrative robustness of the system promotes the reuse of the developed environmental data, which further facilitates data development and shortens the development time.

More specifically, it is possible to promote, for example, the large-scale industrialization of agricultural industry or the like in a brief period of time with ease by making use of thus developed environmental data, thereby enabling the solution of food supply deficiencies or health care problems with practices not heretofore seen conventionally.

BRIEF DESCRIPTION OF THE DRAWINGS

FIG. 6 is a diagram of a state wherein data is stored in an environmental data storing part of the embodiment.

FIG. 7 is a diagram of a state wherein data is stored in a state data storing part of the embodiment.

FIG. 8 is a diagram of a state wherein data is stored in an assessment data storing part of the embodiment.

FIG. 28 is a diagram of data configuration showing a content of environmental data of the embodiment.

FIG. 29 is a diagram of data configuration showing a content of conditional data of the embodiment.

FIG. 30 is a diagram of a state wherein environmental data and conditional data are stored.

BEST MODES OF EMBODYING THE INVENTION

An embodiment of the present claimed invention will be explained with reference to drawings.

<System Configuration>

Figure 1:
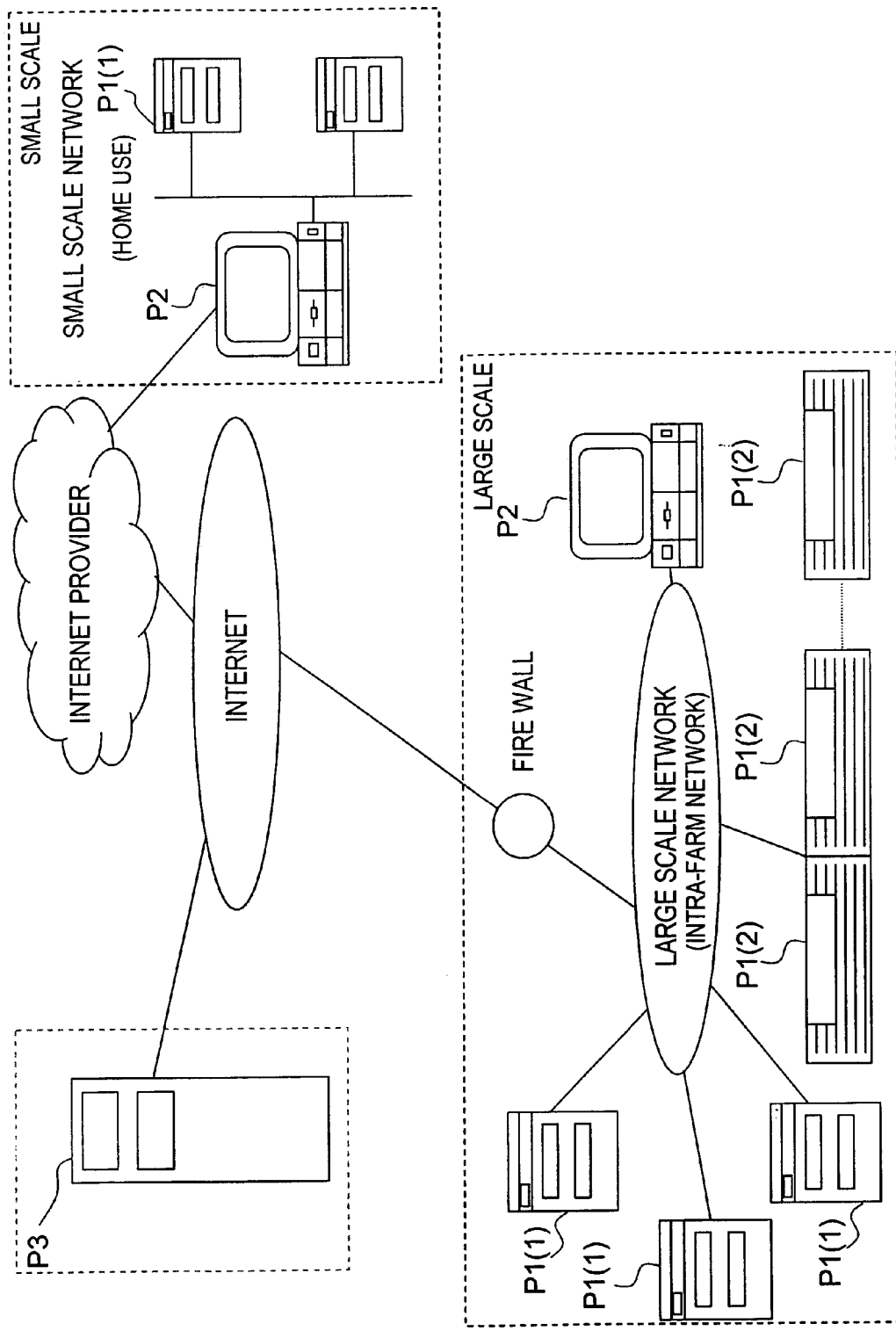
FIG. 1 is a diagram of a whole system configuration of one embodiment in accordance with the present claimed invention.

FIG. 1 is a diagram of a system configuration showing the whole of a system for collecting data pertaining to conditions that promote the growth or health of living organisms of this embodiment. The system for collecting data pertaining to conditions of promoting growth or health of living organisms is so arranged that one or multiple plant culturing devices P1 and one or multiple controlling systems P2 are communicably connected, and one or multiple controlling systems for collecting data pertaining to conditions of promoting growth or health of living organisms P2 (hereinafter sometimes called controlling system) and information processing systems for collecting data pertaining to conditions of promoting growth or health of living organisms P3 hereinafter sometimes called a central information processing system or an information processing system) are communicably connected through a communication network such as the Internet.

Figure 4:
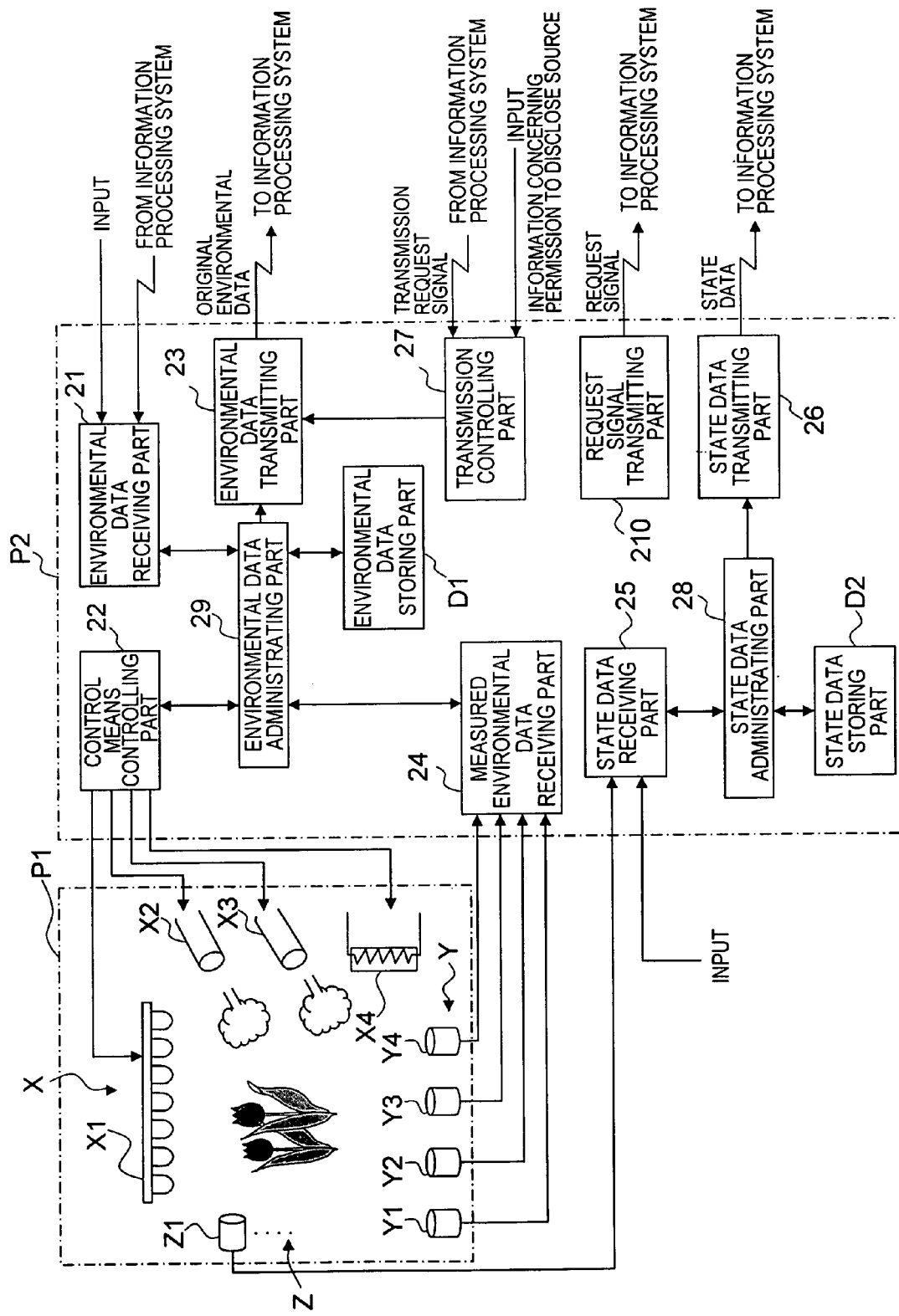
FIG. 4 is a diagram of an internal system configuration of the controlling system and a plant culturing system.

More specifically, as shown in FIG. 4, the plant culturing device P1 is distributed to individuals desiring to foster plant growth by lease or purchase, and comprises an environment control means X that controls environment of culturing plants such as irradiating light, temperature, humidity, $CO_2$ concentration, an environment measuring means Y that detects the environment, and a state measuring means Z that detects a cultured state of plants. In this embodiment, the plant culturing device P1 is so arranged to be able to reproduce generally the same environment of culturing plants under the same controlled state, and multiple different kinds of the plant culturing devices P1 are prepared in accordance with its capacity. (In FIG. 1 two kinds; the plant culturing device P1(1) and the plant culturing device P1(2) are prepared.)

The environment control means X can be driven by a controlling signal from outside and comprises a heater X4 or a window open-close mechanism to control temperature, a light irradiating means X1 to control irradiating light, a mist spraying mechanism X2 to control humidity, a $CO_2$ supplying mechanism X3 to control $CO_2$ concentration or the like. The light irradiating means X1 of this embodiment comprises an arrangement multiple LEDs of at least one red LED, blue LED, green LED, white LED, infrared LED, ultraviolet LED or any combination thereof, and these LEDs are bedded on a print substrate in a planate state, and a stroboscopic or sequential pattern of light emission, a light emitting spectrum, and light intensity for each light emitting spectrum can be controlled by varying a number or a kind of LEDs emitting due to a controlling signal from outside.

The environment measuring means Y can output measured data to outside and comprises a light intensity sensor Y1 that detects intensity of light irradiating plants, a humidity sensor Y2, a $CO_2$ concentration sensor Y3, a temperature sensor Y4 or the like.

The state measuring means Z comprises, an imaging means Z1, such as a still camera and video camera, and can image whole or a part of plants and output it as image data.

The controlling system P2 is used by individuals desiring to foster plant growth and is communicably connected with one or multiple plant culturing devices P1 and controls it. In this embodiment, the controlling system P2 is, for example, a personal computer, and has a function of a server in addition to a browsing function and can transmit data or the like in accordance with a request from outside. The plant culturing device P1 and the controlling system P2 are not necessarily separated as in this embodiment; they may be integrally arranged, or its function may serve a function different from that of this embodiment even though they are separated.

Figure 2:
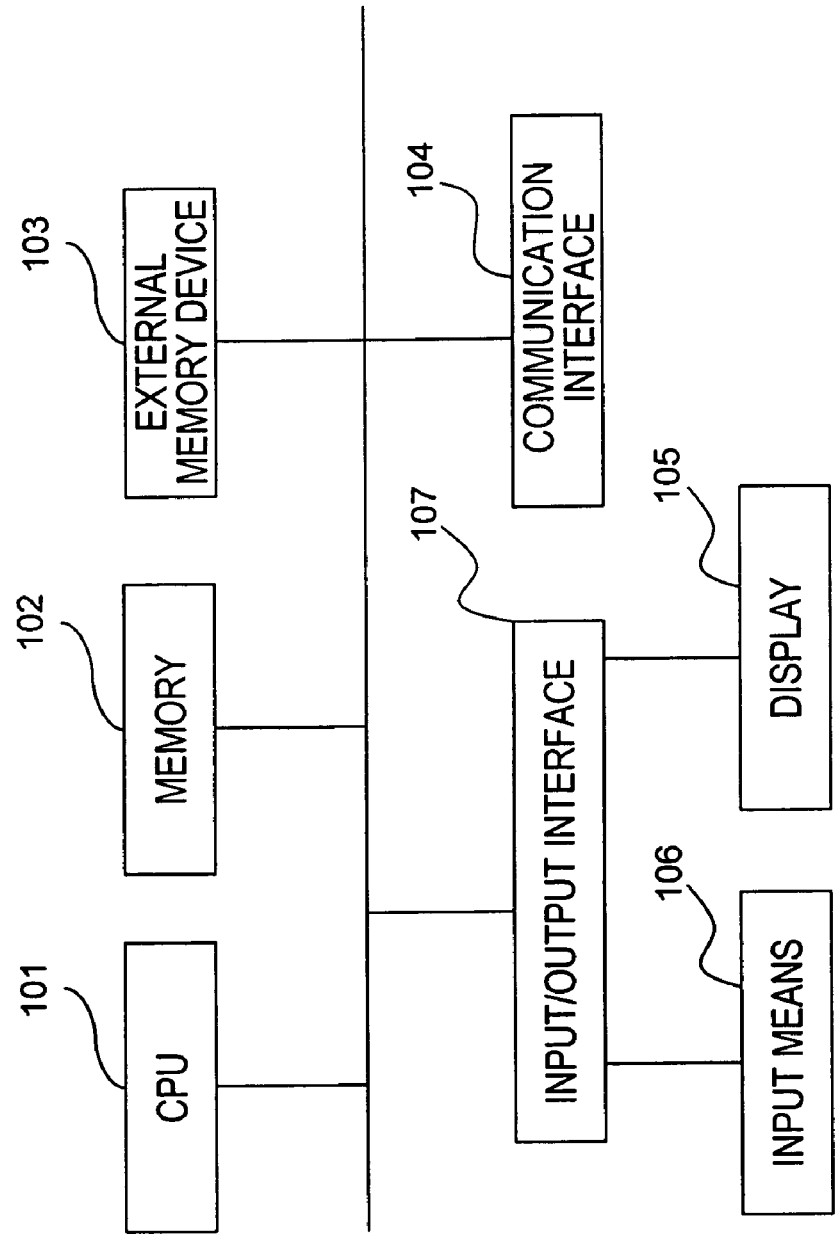
FIG. 2 is a diagram of an internal system configuration of a controlling system of the embodiment.

The controlling system P2 comprises, as shown in FIG. 2, for example, a CPU 101, an internal memory 102, an external memory device 103 such as an HDD, a communication interface 104 such as a modem, a display 105, an input/output interface 107 to communicate with the plant culturing device P1, an input means 106 such as a mouse or keyboard or the like.

The CPU 101 and its peripheral equipment are activated in accordance with a program set in a predetermined area such as the memory 102 or the external memory device 103 and, as shown in FIG. 4, the controlling system P2 functions as an environmental data receiving part 21, a measured environmental data receiving part 24, an environmental data administrating part 29, an environmental data storing part D1, a control means controlling part 22, an environmental data transmitting part 23, a transmission controlling part 27, a state data receiving part 25, a state data transmitting part 26, a request signal transmitting part 210 or the like.

The central information processing system P3 is used by a system administrator and has a function of a server in addition to a browsing function and can transmit data and so on in accordance with a request from outside. The central information processing system P3 is not necessarily integrally formed, it may comprise multiple devices, each of which is connected through a communication line.

Figure 3:
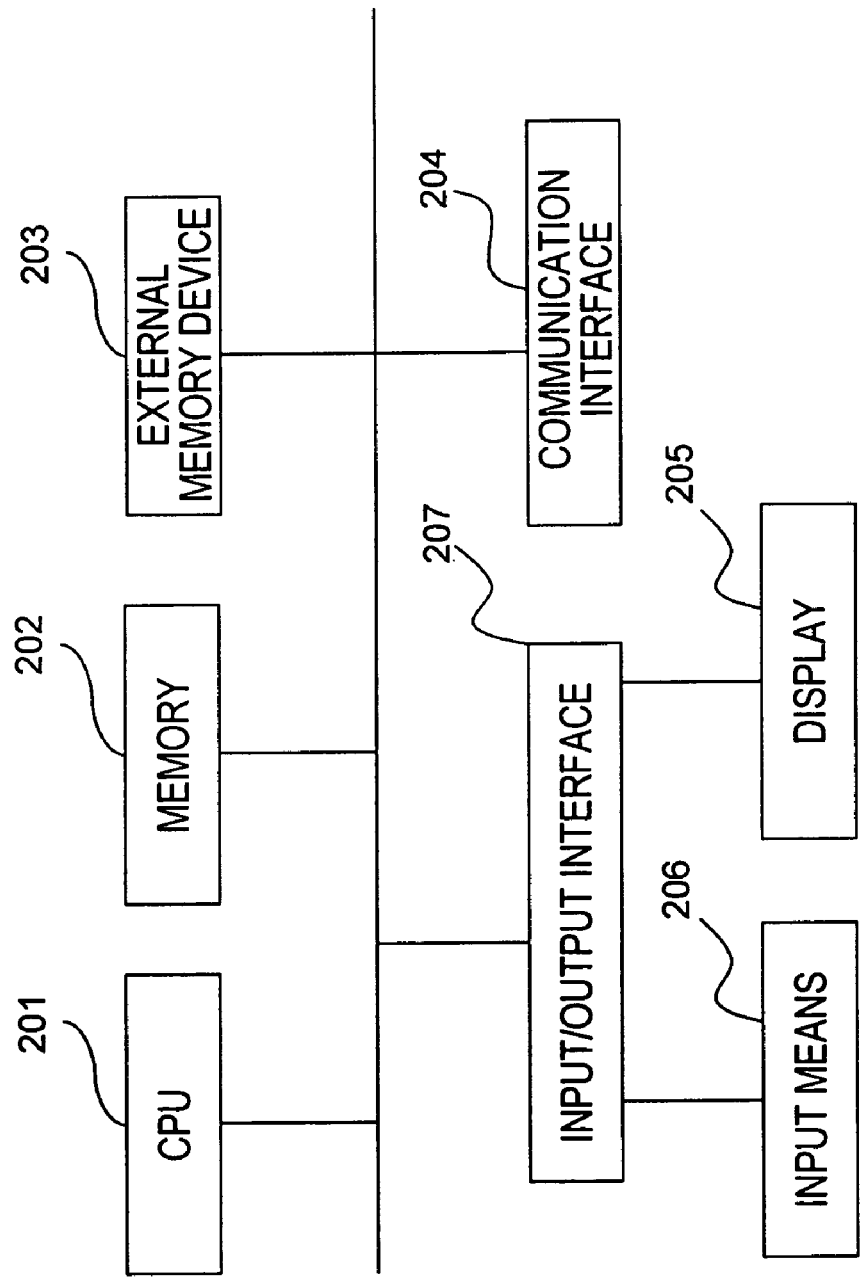
FIG. 3 is a diagram of an internal system configuration of an information processing system of the embodiment.

The central information processing system P3 comprises, as shown in FIG. 3, a CPU 201, an internal memory 202, an external memory device 203 such as an HDD, a communication interface 204 such as a modem, a display 205, an input means 206 such as a mouse and a keyboard or the like.

Figure 5:
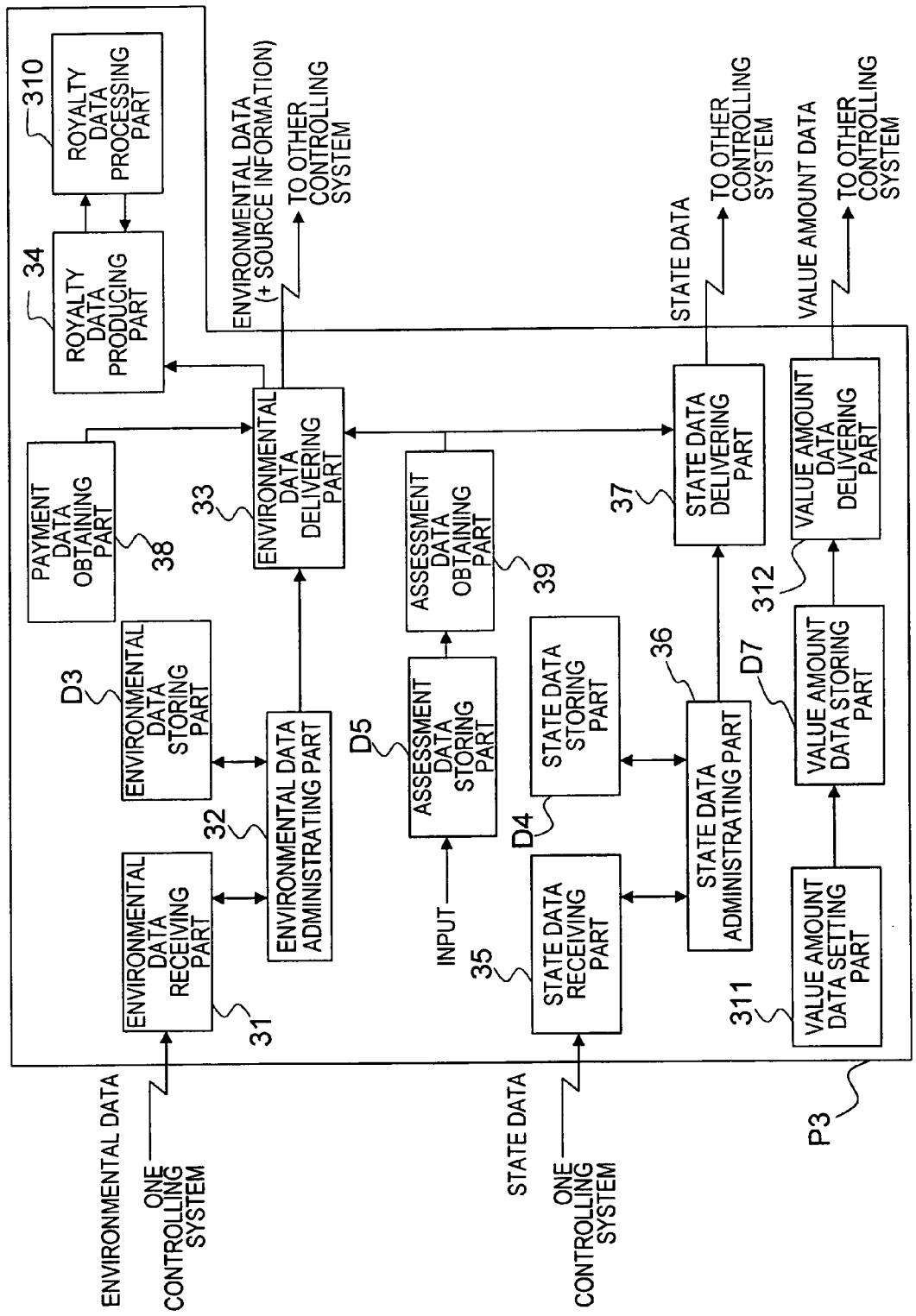
FIG. 5 is a diagram of the internal system configuration of the information processing system of the embodiment.

The CPU 201 and its peripheral equipment are activated in accordance with a program set in a predetermined area such as the memory 202 or the external memory device 203 and, as shown in FIG. 5, the central information processing system P3 functions as an environmental data receiving part 31, an environmental data administrating part 32, a value amount data setting part 311, a value amount data storing part D7, a value amount data delivering part 312, an environmental data delivering part 33, a royalty data producing part 34, a state data receiving part 35, a state data administrating part 36, a state data delivering part 37, a payment data obtaining part 38, an assessment data obtaining part 39, a royalty data processing part 310, a fundamental environmental data storing part (not shown in drawings), a fundamental environmental data delivering part (not shown in drawings) and so on.

<Each Function, Controlling System P2>

Next, each part will be explained.

In the controlling system P2, the environmental data receiving part 21 receives an input of environmental data as being data concerning plant culturing environment including data of light irradiating on a living organism by making use of the input means 106, or receives the environmental data administered by the central information processing system P3 by making use of the communication interface 104 and so on. The environmental data may be a control program wherein a sequence is described in addition to, for example, a measured value or a target value to be controlled of the plant culturing environment (for example, light intensity or humidity and so on), or may be a combination thereof.

The measured environmental data receiving part 24 receives measured environmental data showing a measured value of the plant culturing environment output by each environment measuring means Y and makes use of the input/output interface 107 and so on.

The environmental data administrating part (of the controlling system) 29 administers the environmental data. More concretely, the environmental data administrating part 29 accumulates the environmental data received by the environmental receiving part in the environmental data storing part D1, to be described later, in a predetermined format; updates the environmental data stored in the environmental storing part D1 based on the measured environmental data, or the like, received by a measured environmental data receiving part 24, to be described later; and outputs a part or all of the environmental data stored in the environmental data storing part D1 to the control means controlling part 22, the environmental data transmitting part 23, to be described later, or the like. Especially in this embodiment, the environmental data stored in the environmental data storing part D1 is protected from being copied externally by the environmental data administrating part 29.

"Protected from being copied" here means that copy is incapable by an ordinary operation disclosed to individuals desiring to foster plant growth, and copy is protected by, for example, a password and so on. Leakage of the environmental data to outside may be prevented by not providing the environmental data storing part practically for example, the environmental data storing part is arranged only in a temporary memory area).

The control means controlling part 22 controls each of the environment controlling means X based on the environmental data. More concretely, the control means controlling part 22 obtains environmental data from the environmental data administrating part 29, produces a controlling signal to control the environment controlling means X based on the obtained environmental data and outputs the controlling signal to the environment controlling means X. The control means controlling part 22 may be an FF control based on the environmental data or an FB control with reference to the measured environmental data.

The environmental data transmitting part 23 makes use of the communicating interface 104 or the like, obtains environmental data from the environmental data administrating part 29, obtains a controlling system identifier of one of the controlling systems P2, a plant identifier to identify a kind of a cultured plant and a collateral data such as information concerning the permission to disclose the source, to be described later, and transmits them in a related state to the information processing system P3. The environmental data to be transmitted may be the environmental data received by the environmental data receiving part 21 as it is, but may be new environmental data automatically produced from the received environmental data, the measured environmental data and so on. In this embodiment, for example regarding the irradiated light, the irradiated light data is not an actual measurement value, but the irradiated light data calculated based on the environmental data is considered to be a part of the state data. More concretely, the irradiated light data is light intensity, a stroboscopic or sequential pattern of light emission (such as PWM ratio), a light emitting spectrum (a number or light intensity for each emitted LED of each color) or the like. In this specification, "a controlling system identifier" is an identifier such as a serial number, an IP address and so on to identify the controlling system P2 itself, however, it may be an identifier such as an ID or a name to identify an individual desiring to foster plant growth or an identifier of a plant culturing device administered by the controlling system P2.

The transmission controlling part 27 judges whether or not the environmental data can be transmitted by the environmental data transmitting part 23, or controls a content of collateral data attached to the environmental data. In this embodiment, the environmental data transmitting part 23 transmits the environmental data only after a request signal is transmitted from the information processing system P3, in this case, the transmission controlling part 27 digitally certificates the information processing system P3 so as to judge whether or not the information processing system P3 is the certified information processing system P3 and permits the environmental data transmitting part 23 to transmit the environmental data. In addition, the transmission controlling part 27 also switches a content of information concerning the permission to disclose the source as being the collateral data by an input from the operator. The information concerning the permission to disclose the source will be described later, and when the transmitted environmental data is delivered from the information processing system P3 to another controlling system P2, the information (for example, an identifier of the one controlling system P2) is to judge whether or not the source information suggesting a source of the environmental data is to be attached.

The state data receiving part 25 is to receive state data as being data concerning a state of a cultured plant and makes use of the input/output interface or the like. The state data may be data showing a midstream process of culturing living organisms, may be data showing a final result, or may be data including the midstream process and the final result in a chronological order. In addition, the state data may be data output from the state measuring means Z, or may be data output by, for example, an operator. The state data in this embodiment is image data output from the imaging means X1, weight data measured and input or the like, however, it may be analysis data showing sweetness of fruits and so on.

The state data transmitting part 26 is to transmit the state data received by the state data receiving part 25 in relationship to the identifier of the controlling system P2 and the identifier of plants to the information processing system P3, and makes use of the communication interface 104 and so on.

The request signal transmitting part 210 is to transmit the delivery request signal of the environmental data together with the environmental data identifier to identify the environmental data to the central information processing system P3.

<Each Function, Central Information Processing System P3>

In the central information processing system P3, the environmental data receiving part 31 receives the environmental data produced by one controlling system P2 and transmitted to the environmental data receiving part 31 and each data attached thereto, and makes use of the communication interface 104 and so on.

The environmental data administrating part 32 administers the environmental data received by the environmental data receiving part 31 and each data attached thereto. "Administer" here is to add, delete, update or output the data in accordance with a request from outside in a predetermined mode to the environmental data storing part D3 set at a predetermined area of the memory 102 or the external memory device 103. More concretely, in the environmental data storing part D3, as shown in FIG. 6, the environmental data is stored together with the identifier (noted as an environmental data name in FIG. 6) of the environmental data in relation to the identifier of the one controlling system P2, the identifier of the cultured plant, and the information concerning the permission to disclose the source.

The state data receiving part 35 receives state data as being data concerning a state of culturing and curing living organisms together with a controlling system identifier to identify the one controlling system P2 from the one controlling system P2 and makes use of the communication interface 204 and so on. "A state of culturing and curing living organisms" here also includes results.

The state data administrating part 36 administers the state data received by the state data receiving part 35 and the controlling system identifier of the one controlling system P2. Since a meaning of "Administer" is the same as indicated above, an explanation of "administer" will be omitted. In addition, the state data is, as shown in FIG. 7, stored in the state data storing part D4 together with the identifier (noted as the state data name in FIG. 7) of the state data in relation to the identifier of the one controlling system P2, the identifier of the cultured plant, and the environmental data identifier to identify corresponding environmental data.

The assessment data obtaining part 39 obtains assessment data showing assessment concerning uniqueness or effectiveness of the environmental data administered by the environmental data administrating part 32 from, for example, the assessment data storing part D5. The assessment data has two kinds, one of which is produced automatically and the other of which is produced by inputting a result of an assessment test actually conducted by a person. The assessment data in this embodiment includes at least two kinds of contents, namely with or without uniqueness and with or without effectiveness, and the assessment data is stored, as shown in FIG. 8, in the assessment data storing part D5 in relationship to the environmental data identifier. Concerning the uniqueness, the assessment value of uniqueness is produced automatically by comparing environmental data with the environmental data that has been transmitted and that is stored in the environmental data storing part depending on whether or not the compared data is the same data as the data stored in the environmental data storing part, or whether or not the compared data is within a certain range. In addition, concerning the effectiveness, an assessment test is actually conducted to culture plants by using the environmental data and an assessment value of its effectiveness is produced by an input whether or not a result of the state data is generally the same as the state data received in the assessment test. The assessment data may be data whose content is an assessment value calculated by a predetermined calculation formula whose parameter is multiple assessment items of assessment values with multistage.

The value amount data setting part 311 sets value amount data showing a value amount in compensation for delivering the environmental data in accordance with a predetermined calculation formula with a parameter as the assessment value of the assessment data and the plant identifier.

The value amount data storing part D7 stores the value amount data in relationship to an identifier of the corresponding environmental data.

The value amount data delivering part 312 transmits the value amount data to the another controlling system P2 in relationship to the identifier of the corresponding environmental data.

The payment data obtaining part 38 obtains a payment data showing whether or not the payment for the value to the delivery is finished, or whether or not its payment is guaranteed in relationship to the controlling system identifier to identify the another controlling system P2 to request the environmental data. The payment data is automatically obtained from, for example, account data of financial institutions, however, it may be obtained from input data operated by operators.

The state data delivering part 37 delivers a part or all of the state data administered by the state data administrating part 36 to the another controlling system P2 in relationship to an identifier of the plant. In this embodiment, a condition of delivery is that a content of the assessment data meets a predetermined condition, namely "with uniqueness" and "with effectiveness". Other condition may be acceptable, and the predetermined condition may be that the assessment value calculated with a parameter of assessment value with multistage meets a certain assessment reference value. The state data to be delivered may be state data received by the state data receiving part 35, and may be state data that is altered in order to standardize its format. In addition, the delivery is, in principle, made to all of the other controlling systems P2, however, for example, when it is requested that only a predetermined plant be delivered from a specific controlling system P2, only the state data in relationship to an identifier of the plant may be delivered.

The environmental data delivering part 33 is to obtain the environmental data administered by the environmental data administrating part 32 and to deliver it to the another controlling system P2. The environmental data to be delivered may be the environmental data received by the environmental data receiving part 31, and may be received environmental data that is altered in order to standardize its format. In this embodiment, delivery by the environmental data delivering part 33 is automatically made if an effective payment data is obtained by the payment data obtaining part 38 and a content of the assessment data meets the predetermined condition. The aforementioned predetermined condition is "with uniqueness" and "with effectiveness", however, other condition may be acceptable, and the predetermined condition may be that the assessment value calculated with a parameter of assessment with multistage meets a certain assessment reference value. In addition, the environmental data delivering part 33 analyzes a content of the information concerning the permission to disclose the source when the environmental data is delivered, and, if the content indicates that the source can be disclosed, the environmental data is delivered together with source information for example, an identifier of the one controlling system P2) suggesting its source.

The royalty data producing part 34 produces, updates or deletes the royalty data showing royalty in relationship to a controlling system identifier to identify the one controlling system P2 when the environmental data is delivered. Royalty is a value received in return for disclosing the environmental data proprietary produced by the one controlling system P2 to another controlling system P2, and in this embodiment, the royalty data is calculated based on a predetermined calculation formula whose parameter is a distributed number of the environmental data, an identifier of the plant, or a used amount of the environmental data. It may be conceived that, for example, a used number of times in the controlling system is directly watched or a scale of the controlling system is set as a parameter in order to obtain the used amount of the environmental data, or the data may be indirectly obtained by obtaining an amount of an achieved product.

Figure 9:
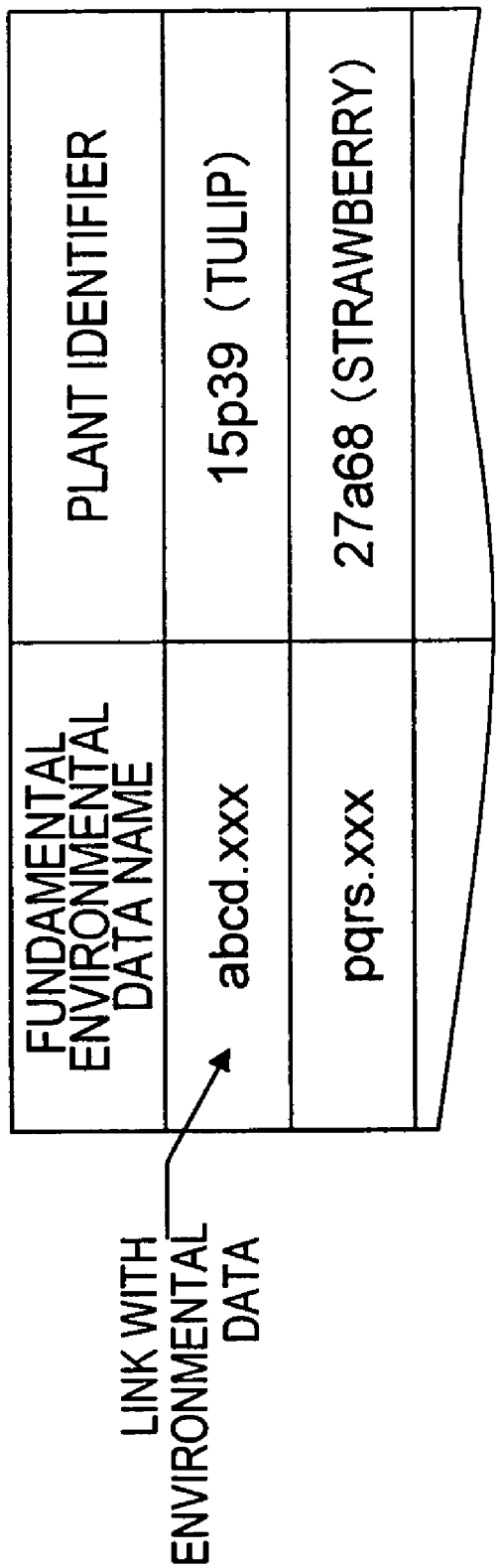
FIG. 9 is a diagram of a state wherein data is stored in a fundamental environmental data storing part of the embodiment.
Figure 10:
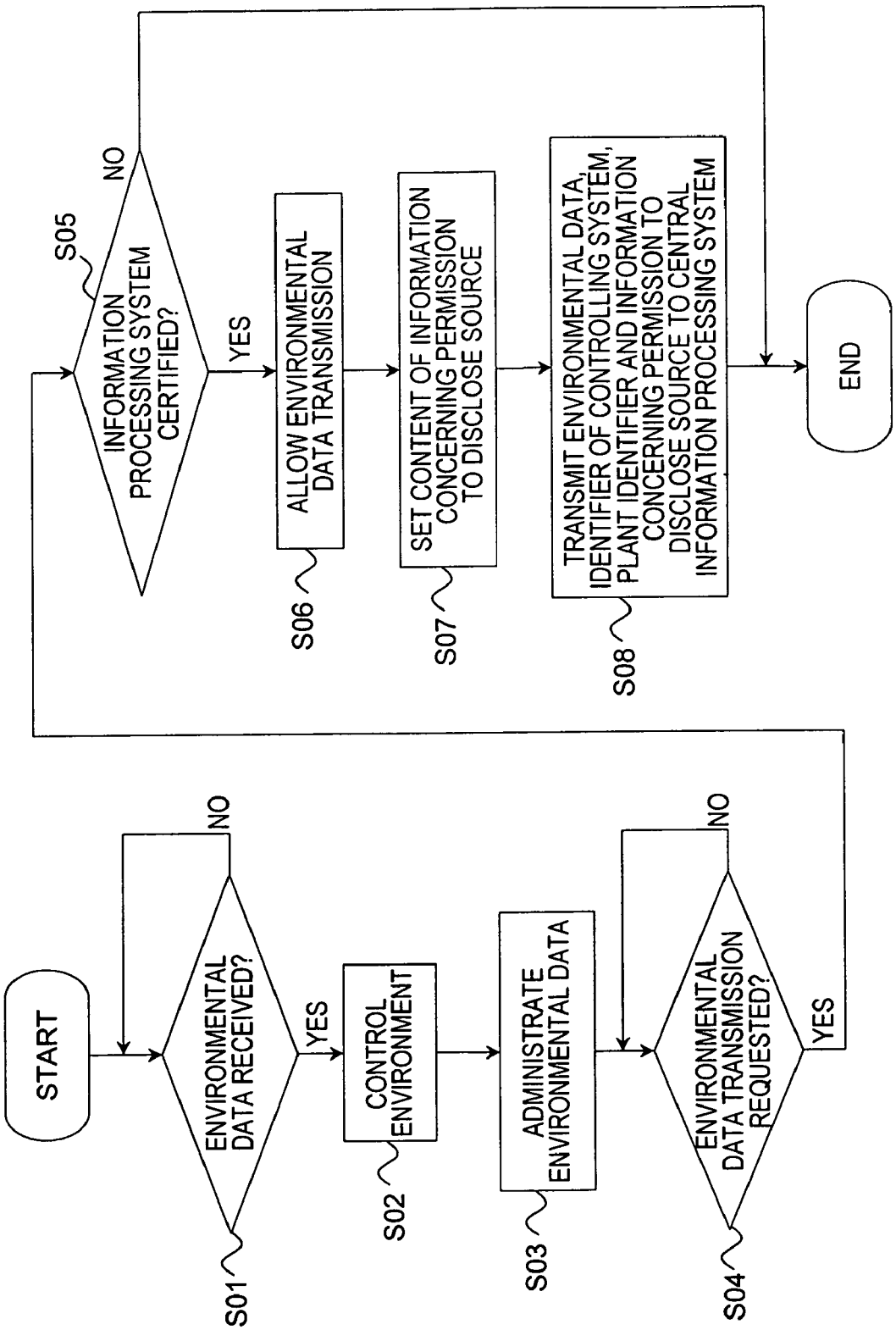
FIG. 10 is a performance flow showing a performance of the controlling system of the embodiment.
Figure 11:
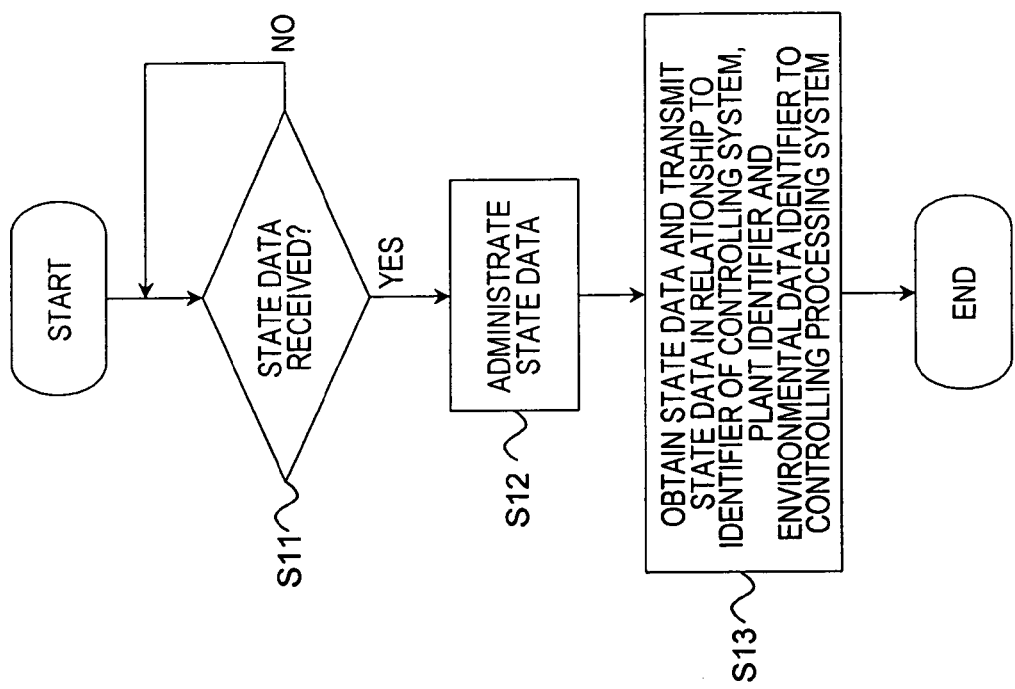
FIG. 11 is a performance flow showing a performance of the controlling system of the embodiment.
Figure 12:
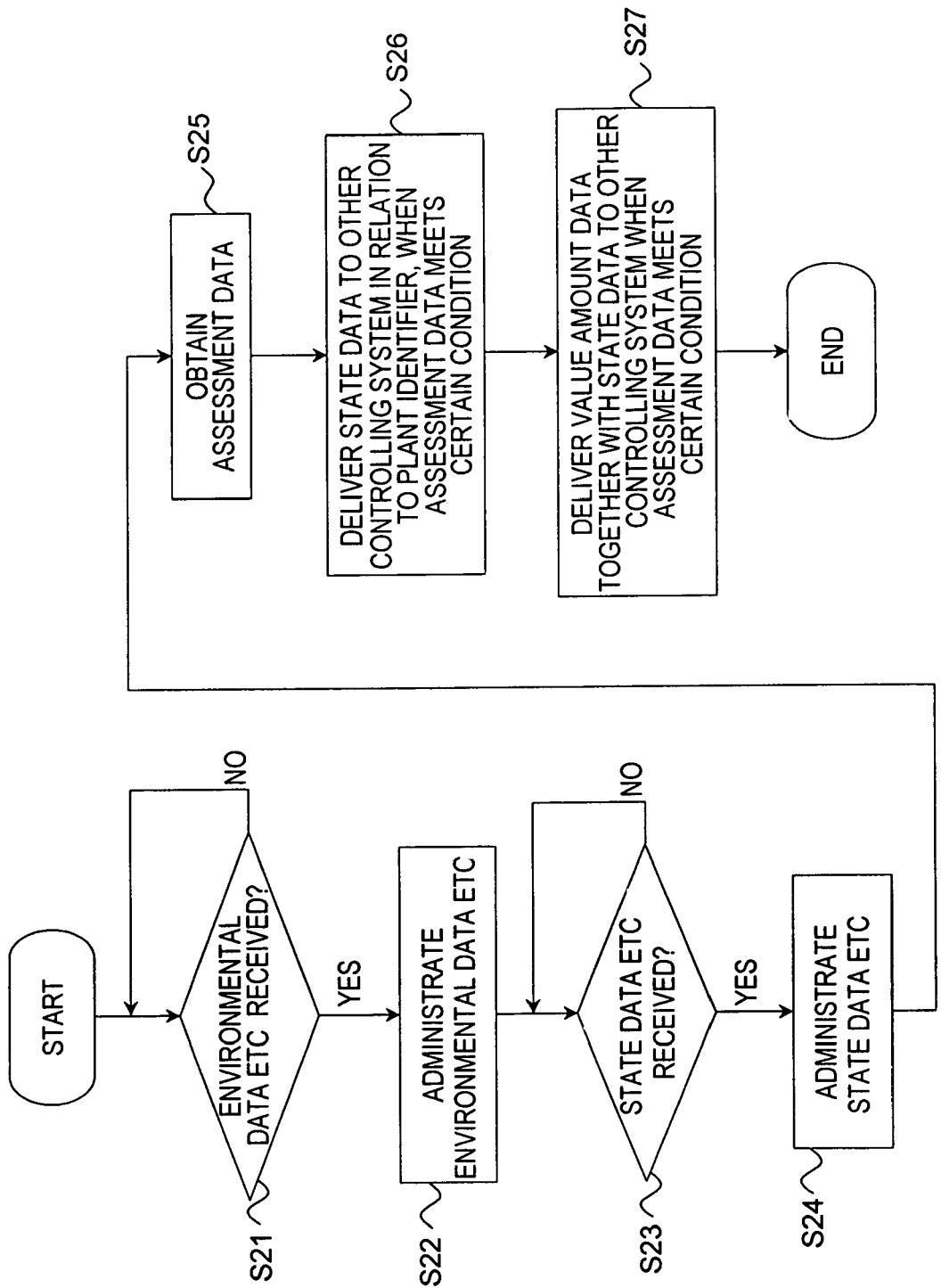
FIG. 12 is a performance flow showing a performance of the information processing system of the embodiment.
Figure 13:
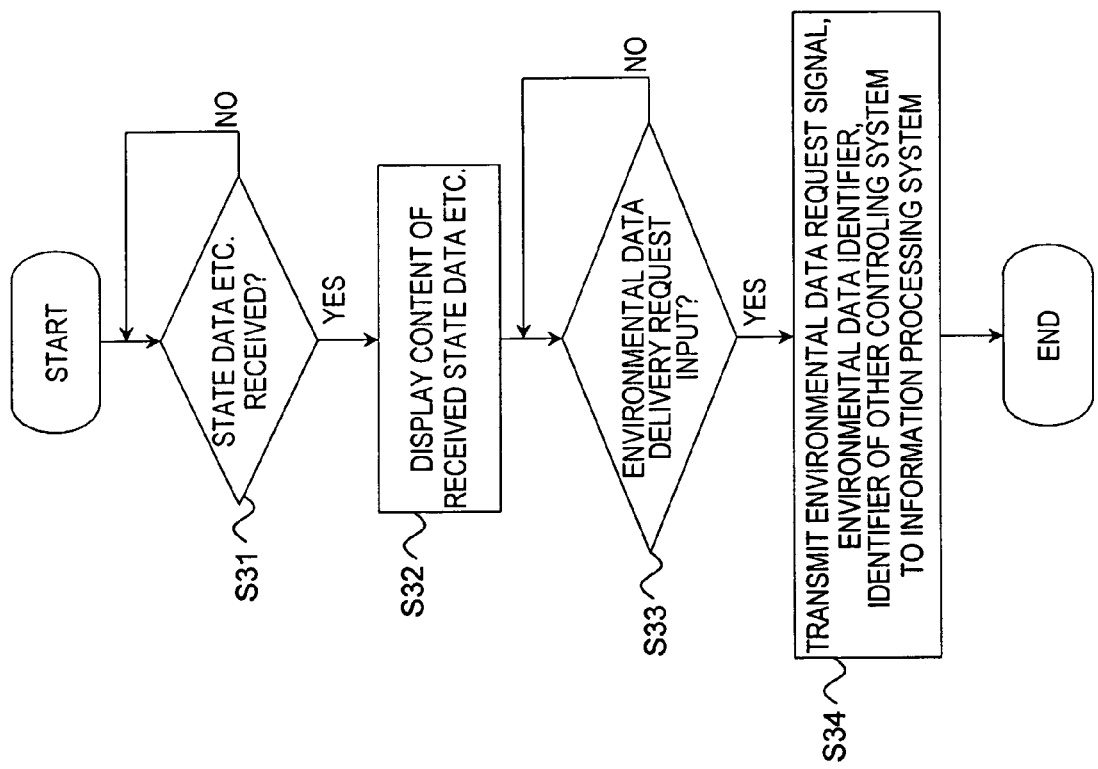
FIG. 13 is a performance flow showing a performance of the information processing system of the embodiment.
Figure 14:
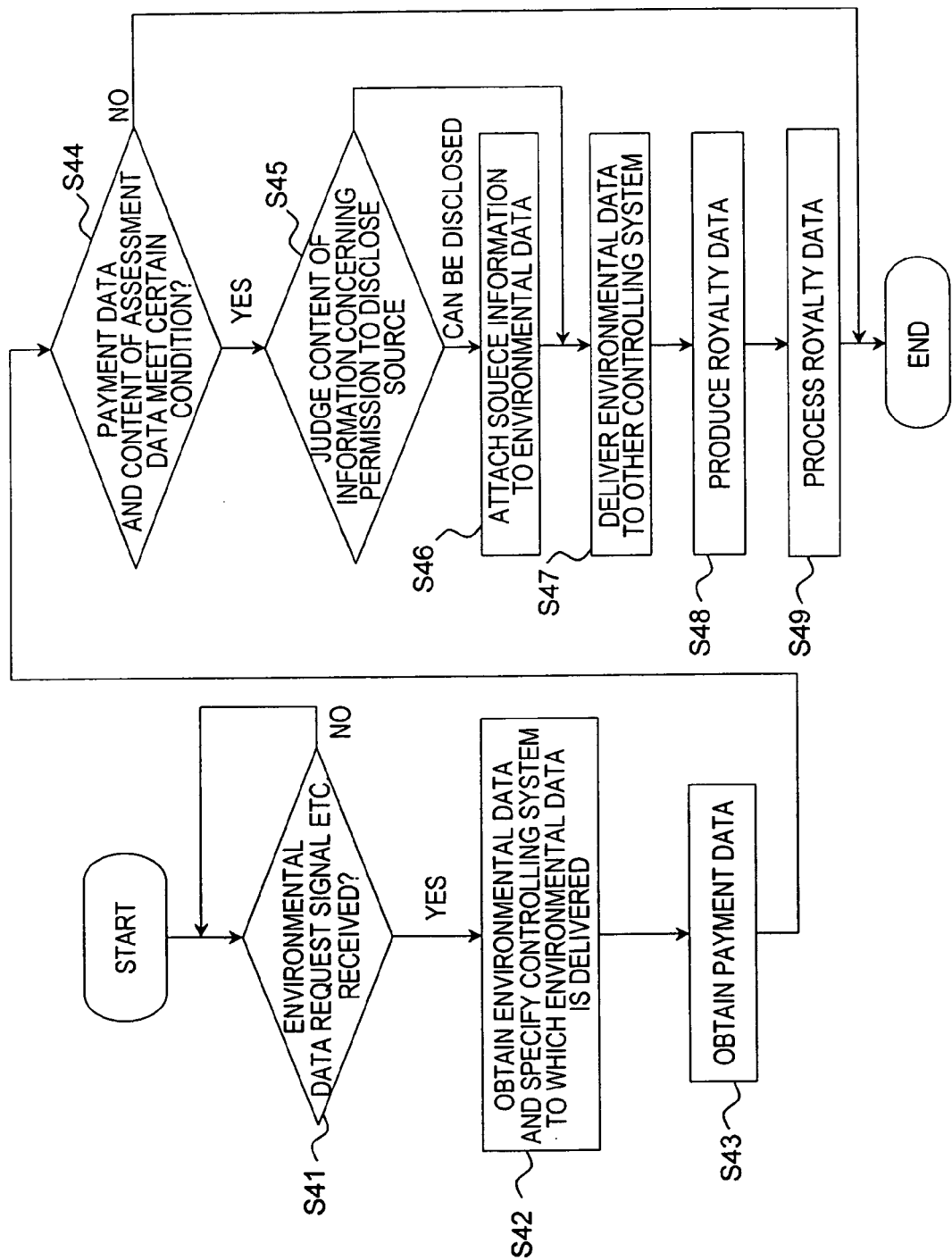
FIG. 14 is a performance flow showing a performance of the controlling system of the embodiment.

The fundamental environmental data delivering part, not shown in drawings, delivers a fundamental environmental data as being a fundamental to produce environmental data for culturing plants in case that there is a request from each of the controlling system P2. The fundamental environmental data is, as shown in FIG. 9, stored in a fundamental environmental data storing part, not shown in drawings, in relationship to the plant identifier.

<Explanation of System Operation>

Next, an example of an operation of a system for collecting data pertaining to conditions of promoting growth or health of living organisms will be explained with reference to flow charts shown in FIG. 10 through FIG. 14.

Figure 15:
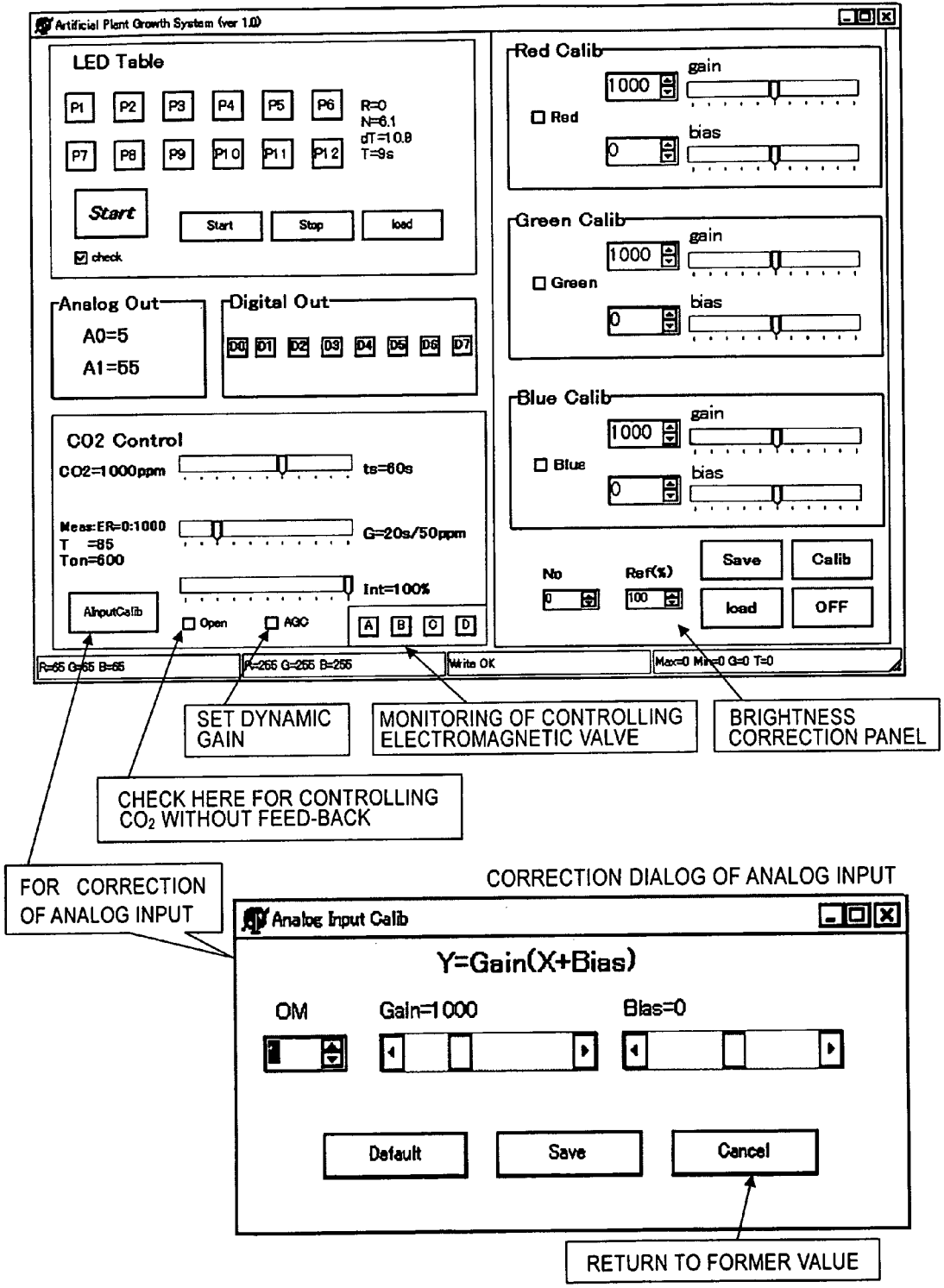
FIG. 15 is a screen explanatory view showing an input display screen of one controlling system of the embodiment.

First, in the controlling system P2, when, for example, each controlling value concerning a plant culturing environment is input in accordance with items or the like shown in the display 105 as shown in FIG. 15, the environmental data receiving part 21 receives the controlling value as the environmental data (Step S01). Each controlling value may be input newly, or the fundamental environmental data or the environmental data already developed by the another controlling system P2 may be loaded and an altered value may be input based thereon. At this time, each controlling value can be set to change sequentially in accordance with time or a plant culturing state, if necessary.

Next, based on the received environmental data, the control means controlling part 22 controls the measured value shown by the measured environmental data received by the measured environmental data receiving part 24 so as to be a value shown by the input environmental data concerning each object to be controlled, more concretely irradiated light, temperature, humidity and $CO_2$ concentration (Step S02). This control is basically the FB control, however, a part of this is an open loop control such as a control of a pulse width in irradiated light.

As mentioned above, the culturing environment is controlled and the plants are to be cultured, wherein the environmental data is administered by the environmental data administrating part 29 in the controlling system P2 (Step S03).

Next, when the environmental data is requested to be transmitted by the information processing system P3 (Step S04), the transmission controlling part 27 digitally certificates the information processing system P3 so as to judge whether the information processing system P3 is certified or not (Step S05). If the information processing system P3 is certified, the environmental data is allowed to be transmitted by the environmental data transmitting part 23 (Step S06). In addition, a content of information concerning the permission to disclose the source is set to be, for example, either one of that the source can be disclosed or that the source can not be disclosed, based on a content input by the operator (Step S07). A size of the information may be switched in a multistage form.

When the transmission is allowed by the transmission controlling part 27, the environmental data transmitting part 23 obtains the environmental data from the environmental data administrating part 32, and transmits the environmental data to the information processing system P3 in relationship to the identifier of the one controlling system P2, a plant identifier to identify a kind of the culturing plant and the information concerning the permission to disclose the source (Step S08).

At the same time, the state data receiving part 25 receives the state data as being data concerning a plant culturing state (Step S11).

The state data received by the state data receiving part 25 is administered by the state data administrating part 29 in the controlling system P2 (Step S12), the state data transmitting part 26 obtains the state data from the state data administrating part 36 at a predetermined timing, and transmits the state data to the information processing system P3 in relationship to the identifier of the controlling system P2, the plant identifier and the identifier of the corresponding environmental data (Step S13). The predetermined timing can be set variously by an operator such as a certain interval, at a completion time for plant culturing, or an external input.

In the central information processing system P3, the environmental data receiving part 31 receives the environmental data produced and transmitted by one controlling system P2 and each data attached thereto (Step S21).

The received environmental data and each data attached thereto are accumulated in the environmental data storing part D3 in a predetermined format as shown in FIG. 8 so that the environmental data administrating part 32 administers it (Step S22).

At the same time, the state data receiving part 35 receives the state data transmitted by the one controlling system P2 together with the controlling system identifier of the one controlling system P2, the plant identifier and the identifier of the corresponding environmental data (Step S23).

Then the state data administrating part 36 administers the received state data and so on (Step S24).

Next, the assessment data obtaining part 39 obtains an assessment data showing assessment concerning uniqueness, effectiveness and the like of the received environmental data administered by the environmental data administrating part 32 from the assessment data storing part D5 (Step S25). The assessment data concerning uniqueness is automatically produced by comparing the data with data that has been transmitted and that is stored in the environmental data storing part D3. Meanwhile, the assessment data concerning effectiveness is produced by actually culturing the plant by utilizing the assessment data, comparing it with the received state data by an operator, and inputting the result of comparison.

Next, in case that the assessment data meets a certain condition, namely in case that a content of the assessment data is "with uniqueness" and "with effectiveness" in this embodiment, the state data distributing part 37 distributes a part or all of the state data administered by the state data administrating part 36 to the another controlling system P2 in relationship to the plant identifier (Step S26). The state data is in principle distributed to all of the other controlling systems P2, however, for example, in case that a request is made to distribute the state data to only a predetermined plant from the specific controlling system P2, only the state data in relationship to the identifier of the plant is distributed. In addition, the value amount data distributing part 312 distributes a value amount data showing a value amount necessary to distribute the corresponding environmental data to the another controlling system P2 (Step S27).

Figure 16:
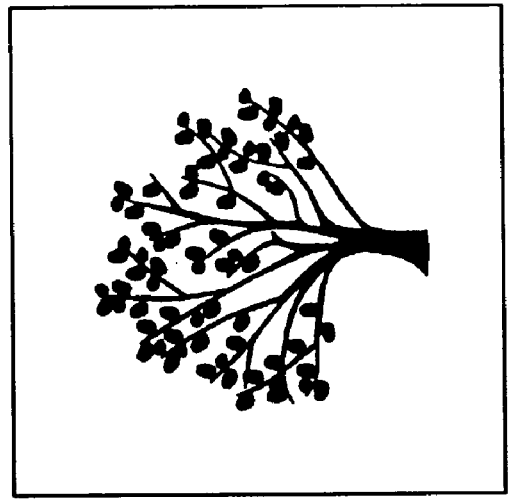
FIG. 16 is a screen explanatory view showing an input display screen of another controlling system of the embodiment.
Figure 16:
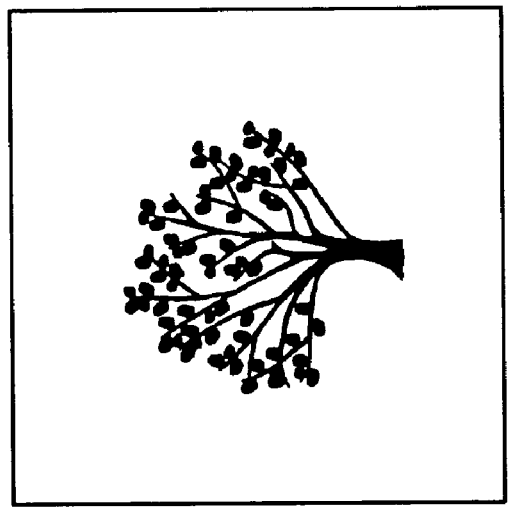
Figure 16:
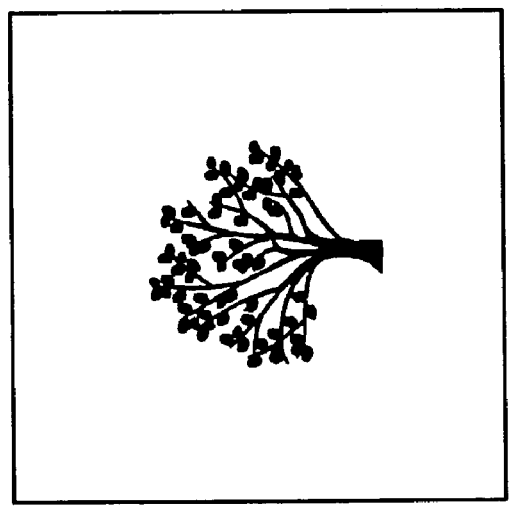
Figure 17:
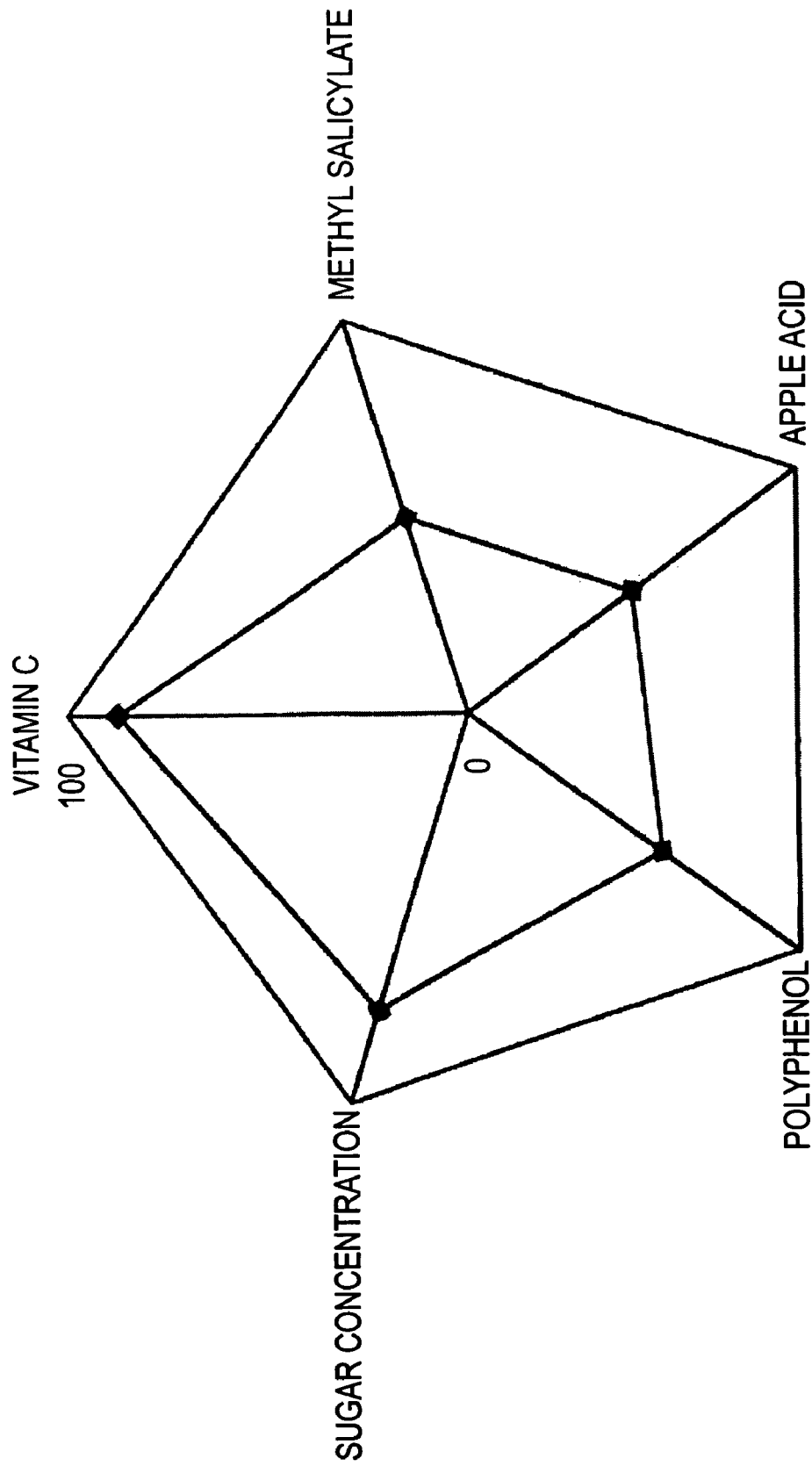
FIG. 17 is a screen explanatory view showing an input display screen of another controlling system of the embodiment.

In the another controlling system P2 that has received the delivered state data and the value amount data (Step S31), contents of the state data and the value amount data are displayed on a display (Step S32). The state data is, for example, as shown in FIG. 16, displayed in an image (a still image or a moving image) wherein a culturing process of the plant is related with time, and displays an analytical result graphically in accordance with a predetermined analytical item as shown in FIG. 17. Meanwhile, a value amount corresponding to download or upload of a requested environmental data is also displayed based on the value amount data. At this time, items relating to the environmental data are not displayed at all. When an environmental data corresponding to requested state data is selected and a request to deliver the data is input (Step S33), the environmental data request signal is transmitted to the information processing system P3 together with the requested environmental data identifier and the identifier of the another controlling system P2 (Step S34).

When the environmental data request signal is received by the information processing system P3 (Step S41), the environmental data distributing part 33 obtains the corresponding environmental data based on an environmental data identifier attached thereto from the environmental data administrating part 32 and specifies the another controlling system P2 to deliver the environmental data based on the controlling system identifier (Step S42).

At this time, the payment data obtaining part 38 automatically obtains a payment data concerning payment of the value or guarantee of payment for the delivery from, for example, account data from financial institutions in relation to the controlling system identifier to request the environmental data (Step S43).

If the payment data obtaining part 38 obtains effective payment data and a content of the assessment data is "with uniqueness" and "with effectiveness" (Step S44), the environmental data distributing part 33 distributes the environmental data to the another controlling system P2 (Step S45). At this time, a content of the information concerning the permission to disclose the source is judged (Step S46), and if the content is that the source can be disclosed, source information (for example, an identifier of the one controlling system P2) suggesting its source of the environmental data is attached to the environmental data (Step S47).

As mentioned above, if the environmental data is distributed or is in a state that the environmental data is definitely to be distributed, the royalty data producing part 34 produces royalty data concerning royalty in relationship to the controlling system identifier that identifies the one controlling system P2 (Step S48).

Then the royalty data processing part 310 processes varieties of processes such that the royalty data is transmitted to financial institutions or its content is output in printing (Step S49).

As mentioned above, royalty is paid to an individual desiring to foster plant growth who has created and disclosed an original and effective plant culturing environment by utilizing the plant culturing device P1 and the controlling system P2.

As a result, in accordance with this embodiment, since royalty is paid to a person who has found an effective environmental data, it is possible to collect environmental data such as culturing living organism that conventionally tends to be kept in secret in return for profits of royalty without difficulty. In addition, since the collected environmental data can be utilized widely by other individuals desiring to foster plant growth, it is possible to urge large-scale industrialization of, for example, agricultural industry without difficulty at once.

In addition, since there is a sense of security that royalty is paid, a large number participants to develop environmental data can be prospected and the environmental data of this kind that have extremely large number of parameters and require significant work to find can be developed rapidly. At the same time, since the developed environmental data is administered certainly and can be reused, it is possible to shorten a period of time to develop environmental data by utilizing the developed environmental data.

Especially in this embodiment, since the state data showing a result of culturing plants is first disclosed to others, it is possible to judge precisely whether the environmental data should be requested to deliver or not, thereby enabling promotion to utilize the presented environmental data by the others. In addition, since the others can not know the environmental data necessary for culturing the plants unless a value is paid, it is possible for a person who develops a new environmental data to offer as know-how without anxious.

In addition, since the offered environmental data or state data is distributed to the another controlling system only if an effective assessment data can be obtained, credibility can be guaranteed to the distributed environmental data.

Furthermore, since royalty is established in accordance with a distributed number of the environmental data or a content of the assessment data, the royalty can be highly fair.

In addition, since the state data is displayed in an image or a fundamental environmental data that can be downloaded by anybody is provided, usability can be extremely superior.

Another embodiment of the present invention will be explained next. In this embodiment, an LED therapeutic device X is used instead of the plant culturing device P1 of the former embodiment. The same reference code is given to components corresponding to the former embodiment.

<System Configuration>

Figure 18:
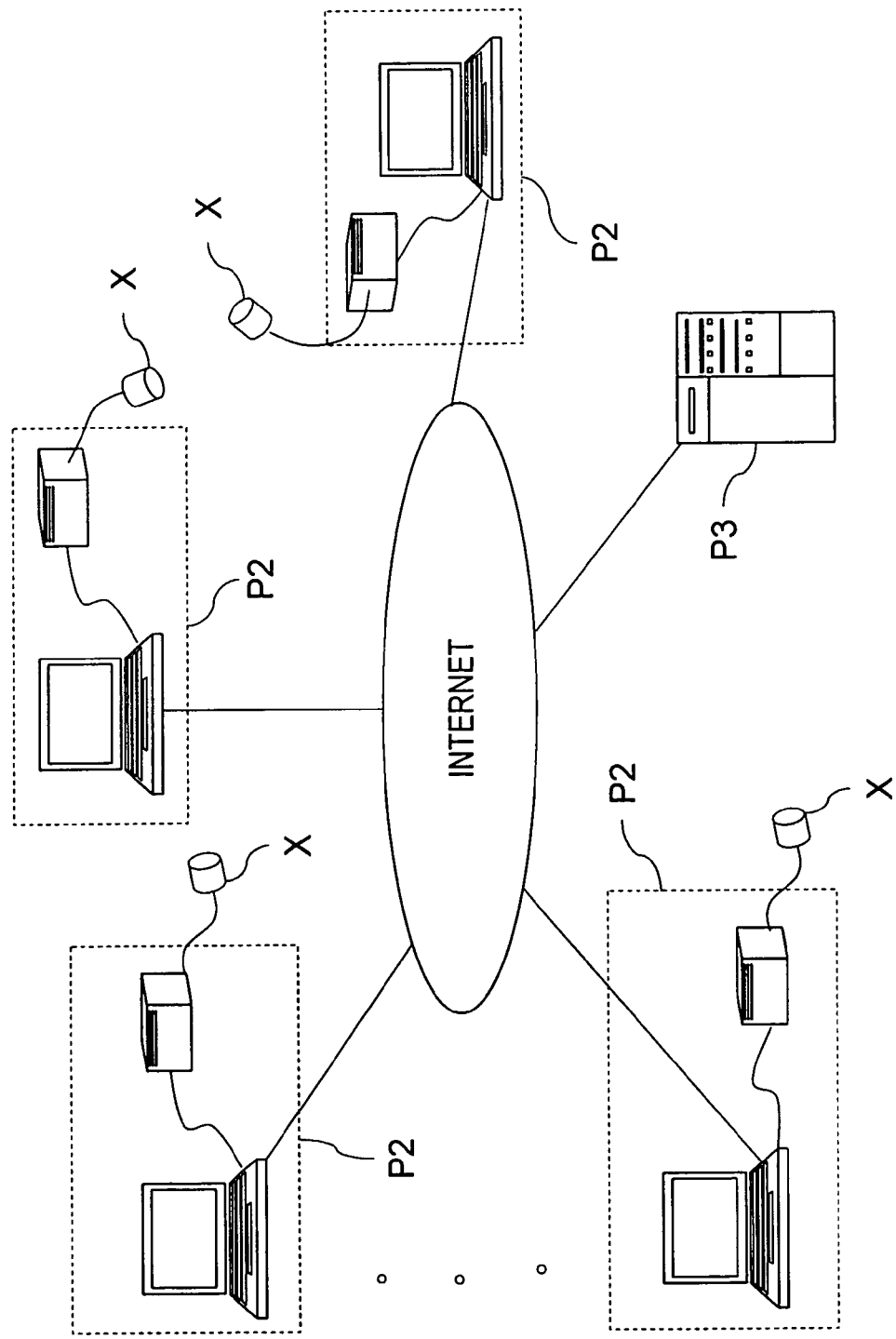
FIG. 18 is a diagram of a whole system configuration of another embodiment in accordance with the present claimed invention.
Figure 19:
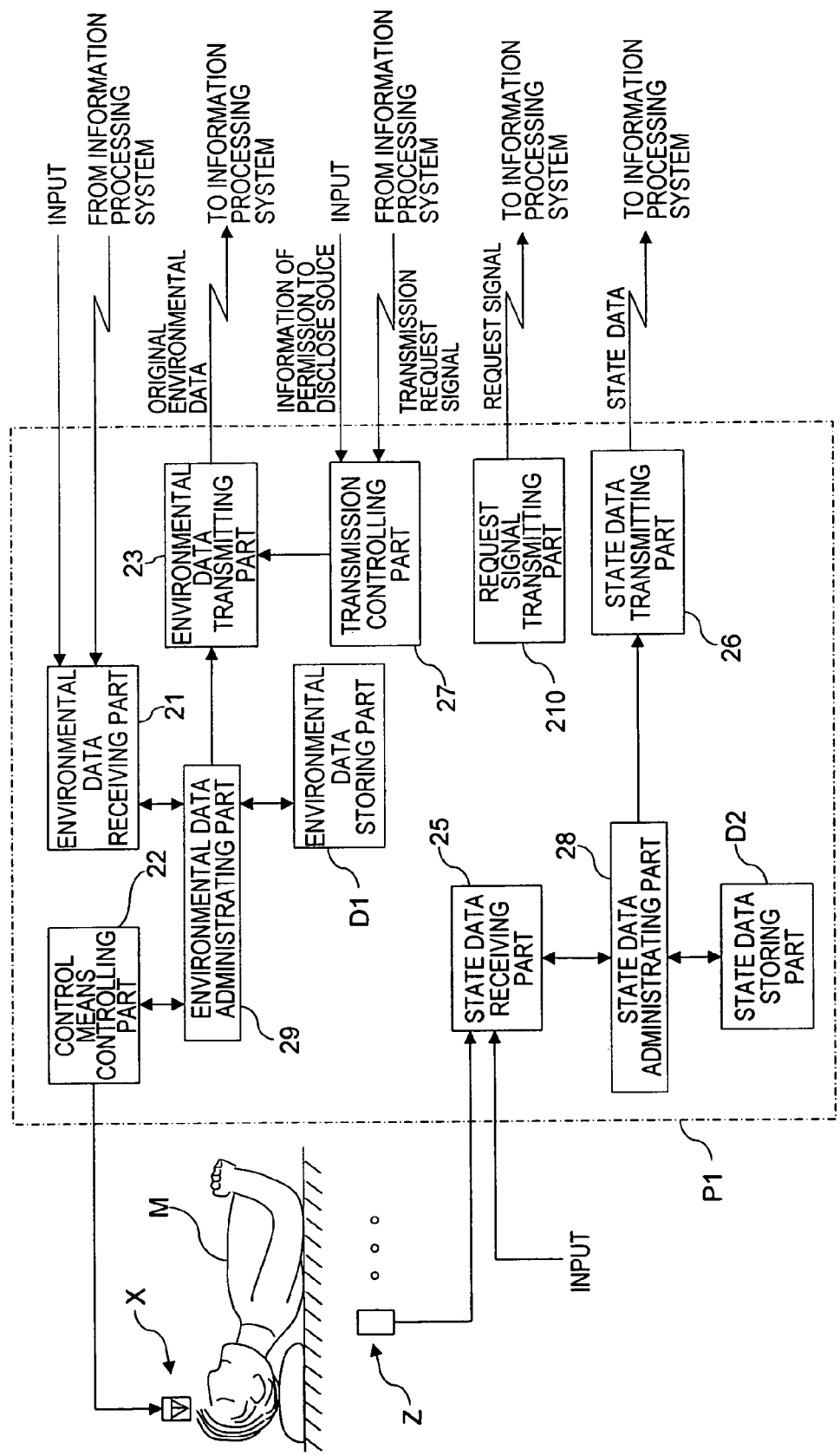
FIG. 19 is a diagram of an internal system configuration of a controlling system of the embodiment.

FIG. 18 and FIG. 19 are diagrams of a system configuration showing whole of a system for collecting data pertaining to conditions of promoting growth or health of living organisms in this embodiment. The system for collecting data pertaining to conditions of promoting growth or health of living organisms is so arranged that one or multiple controlling systems P2 and a central information processing system P3 are connected through a communication network such as the Internet and one or multiple LED therapeutic devices X and a state measuring means Z (not shown in FIG. 18) are connected with the controlling systems P2.

Figure 20:
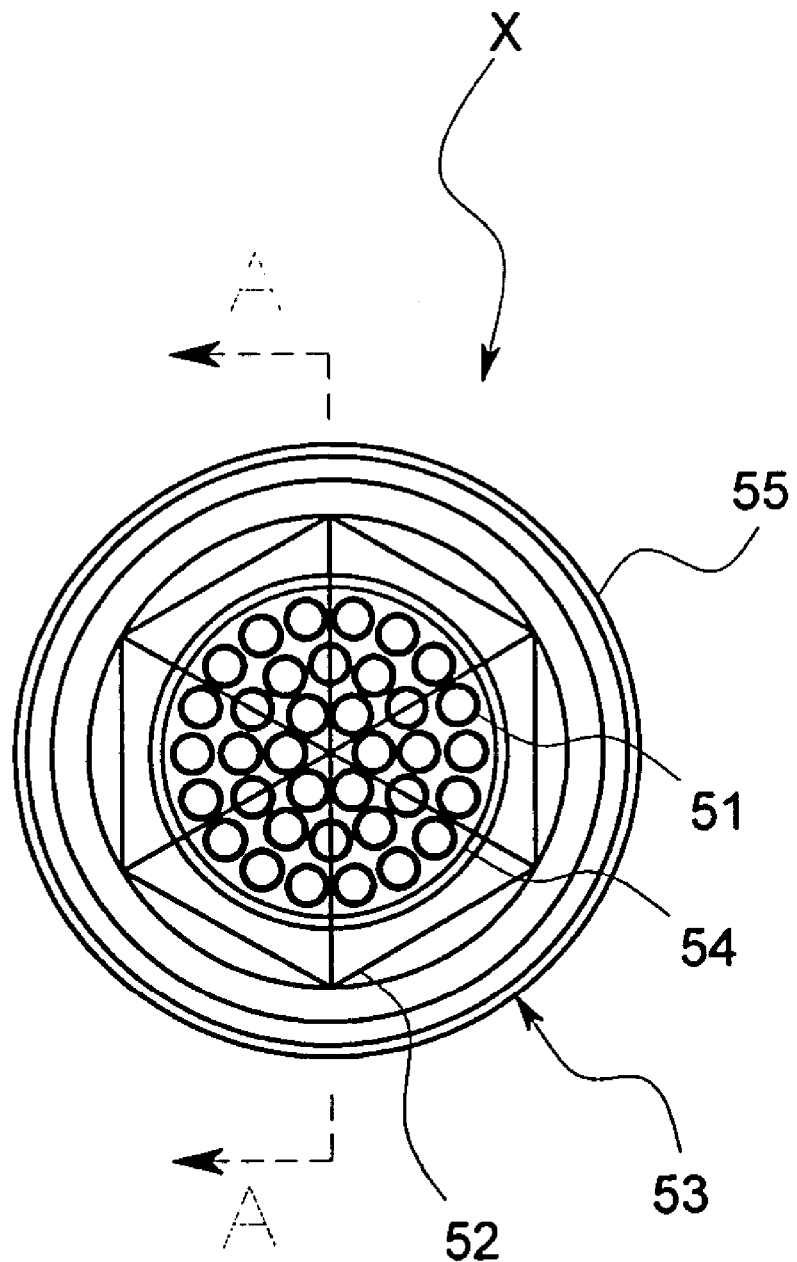
FIG. 20 is a front view showing an LED therapeutic device of the embodiment.
Figure 21:
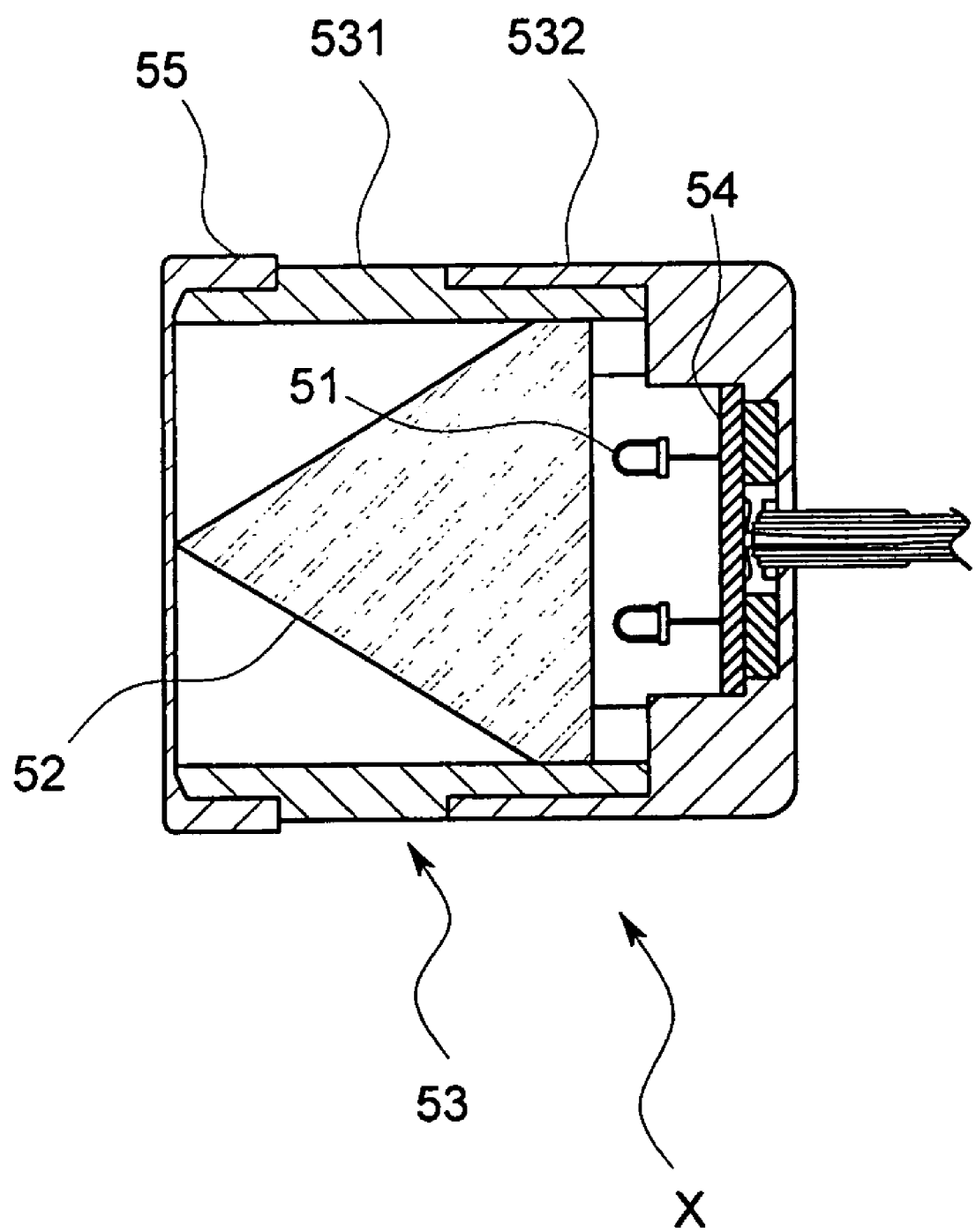
FIG. 21 is a cross-sectional view taken along a line A-A in FIG. 20.
Figure 22:
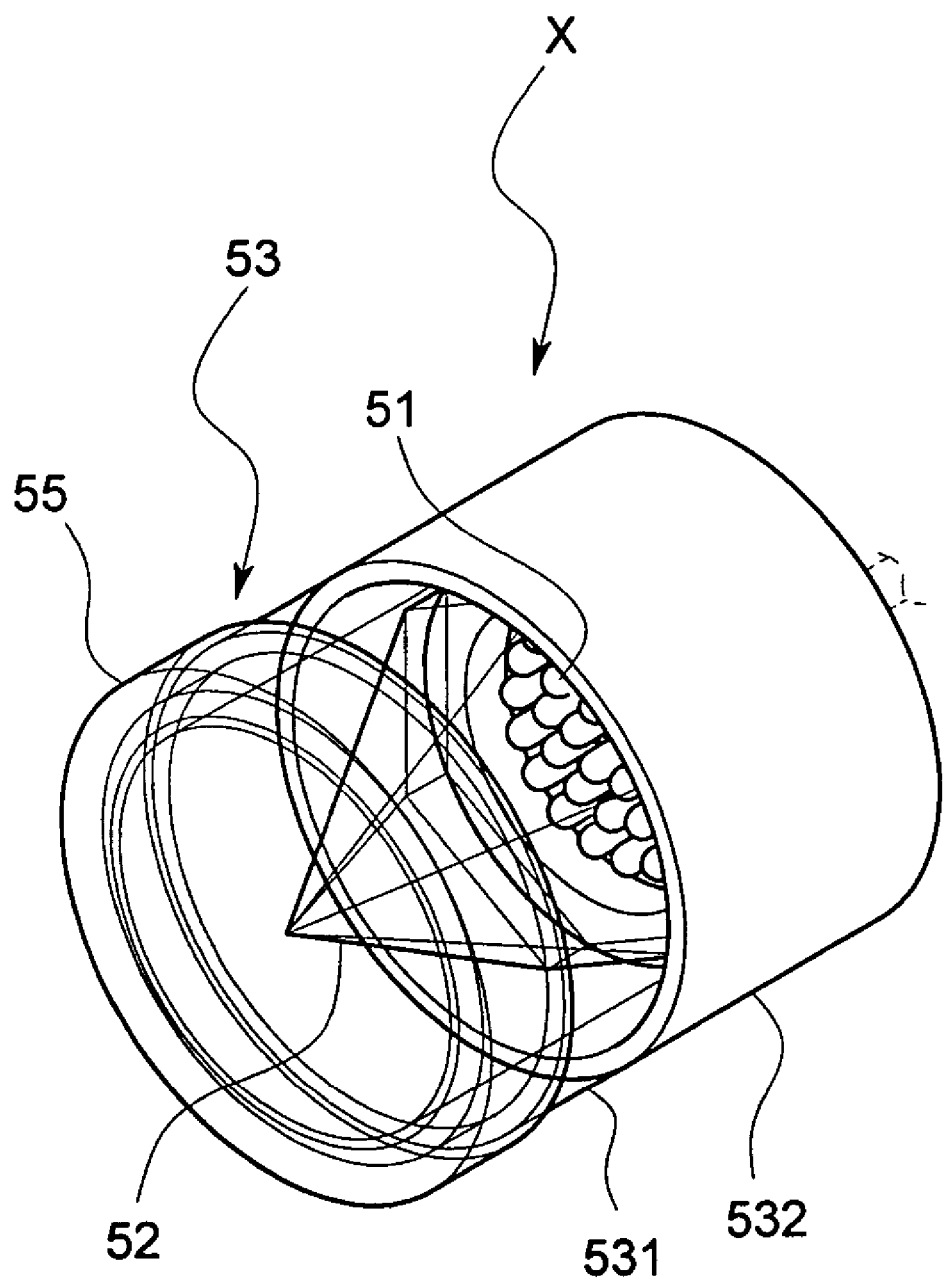
FIG. 22 is a perspective view showing the LED therapeutic device of the embodiment.
Figure 23:
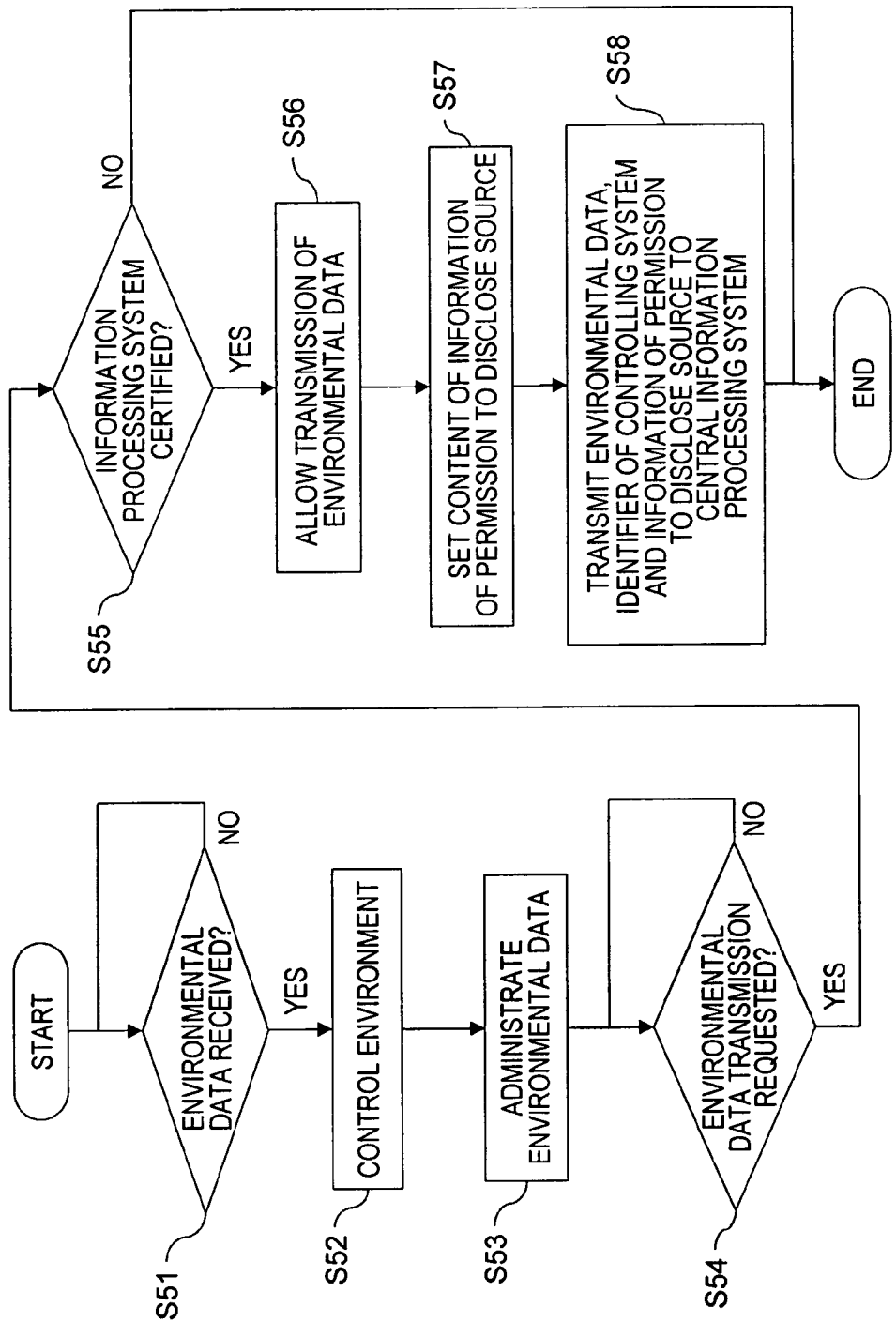
FIG. 23 is a performance flow showing a performance of a controlling system of the embodiment.
Figure 24:
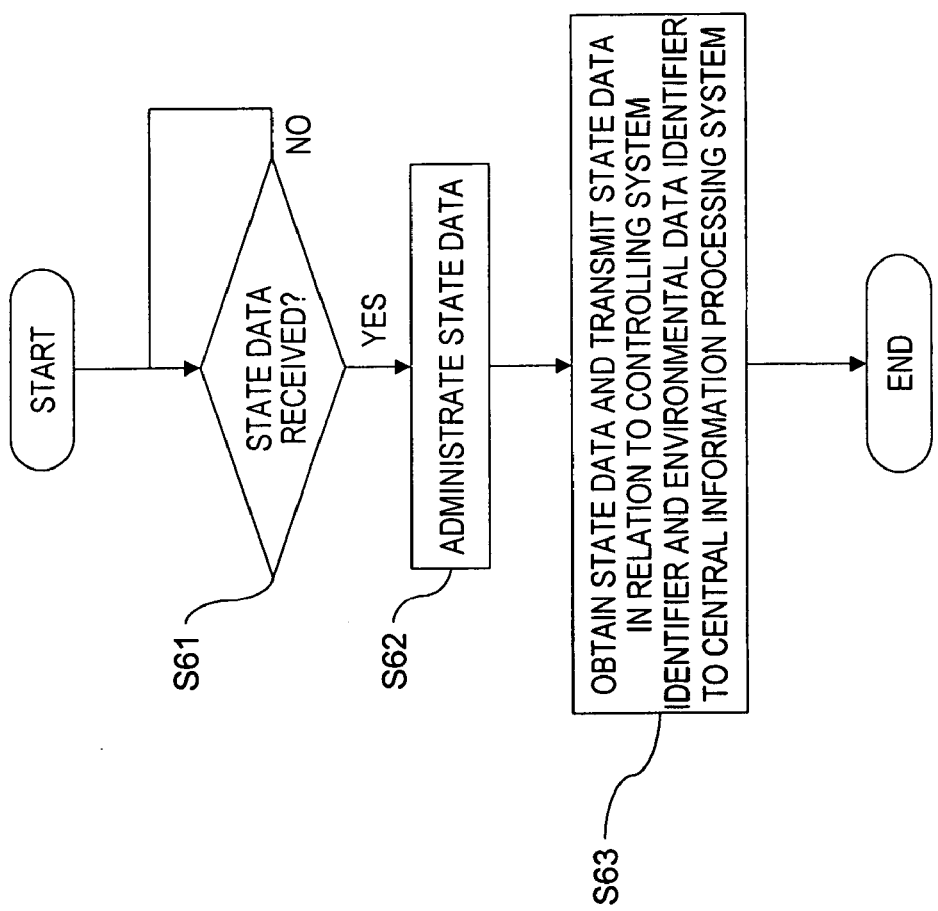
FIG. 24 is a performance flow showing a performance of the controlling system of the embodiment.
Figure 25:
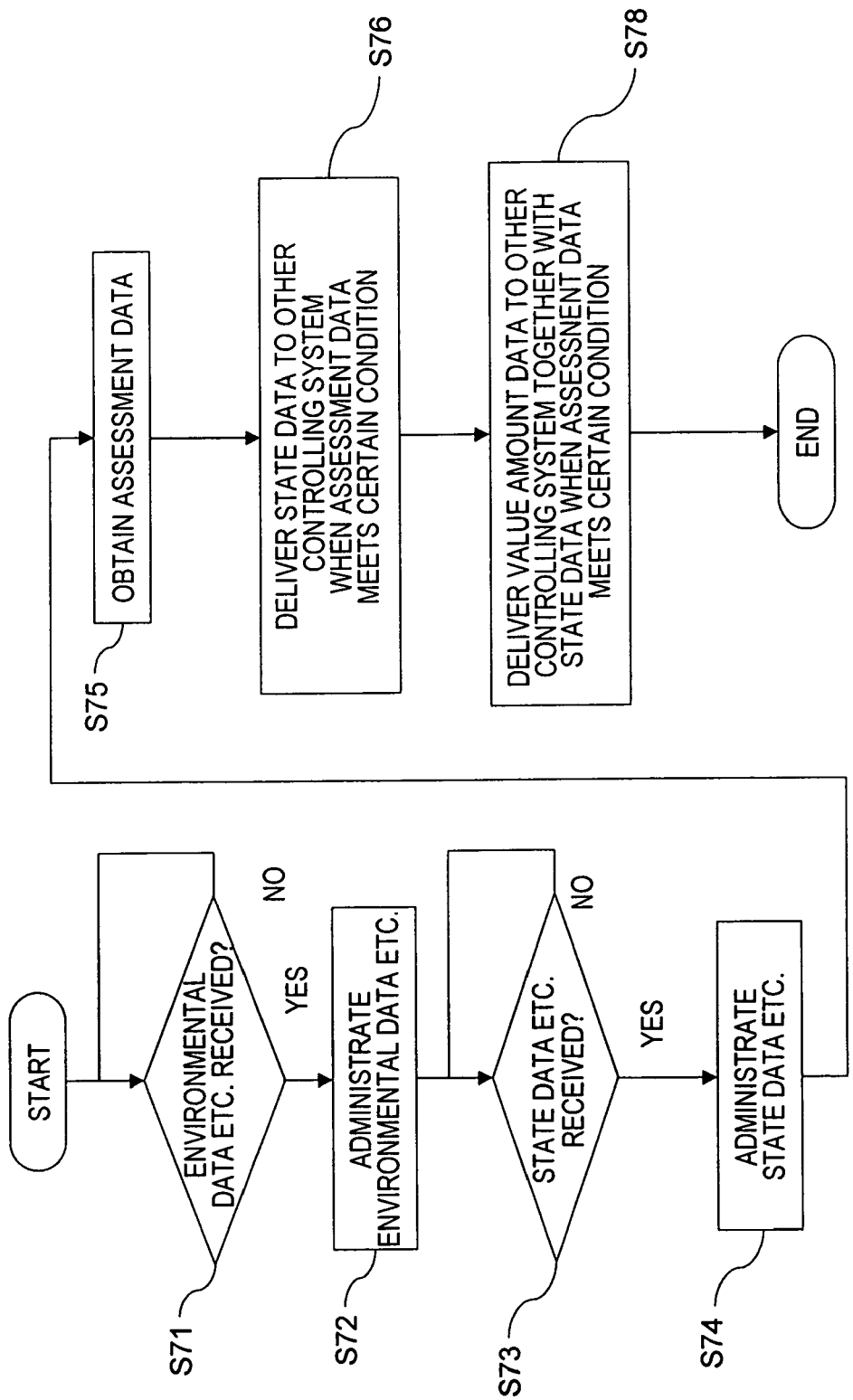
FIG. 25 is a performance flow showing a performance of the information processing system of the embodiment.
Figure 26:
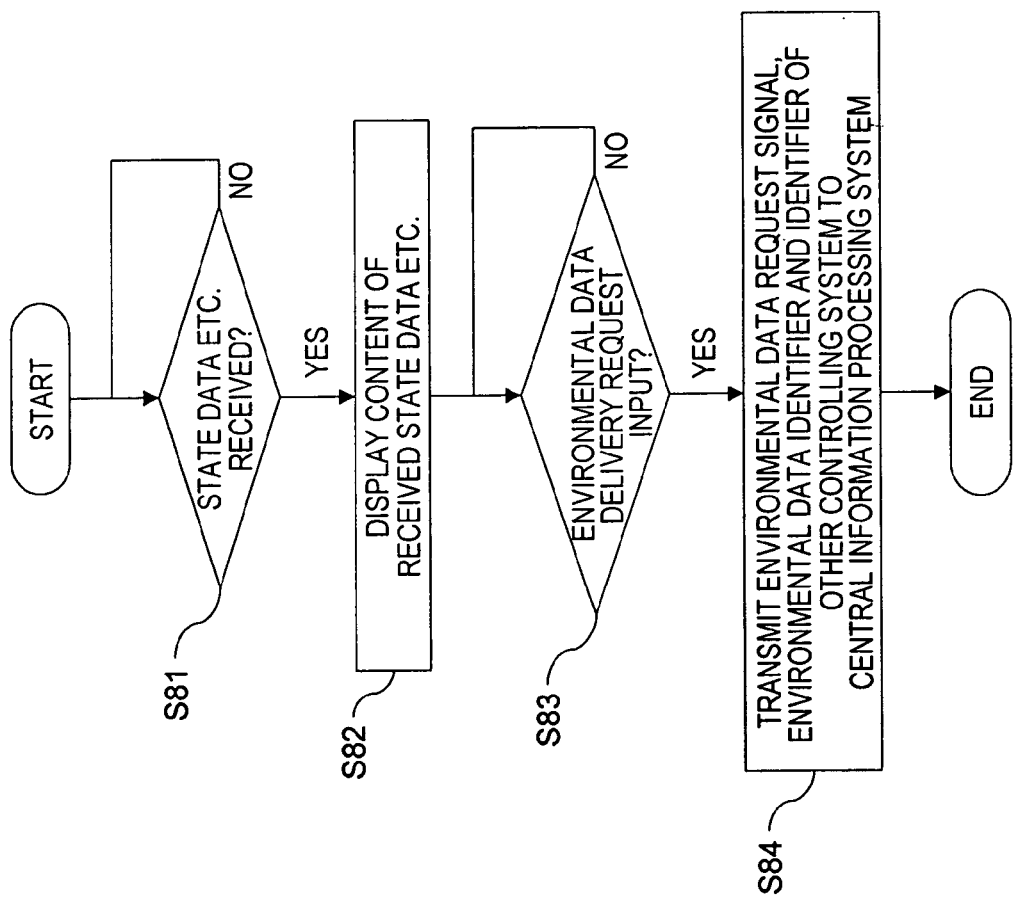
FIG. 26 is a performance flow showing a performance of the information processing system of the embodiment.
Figure 27:
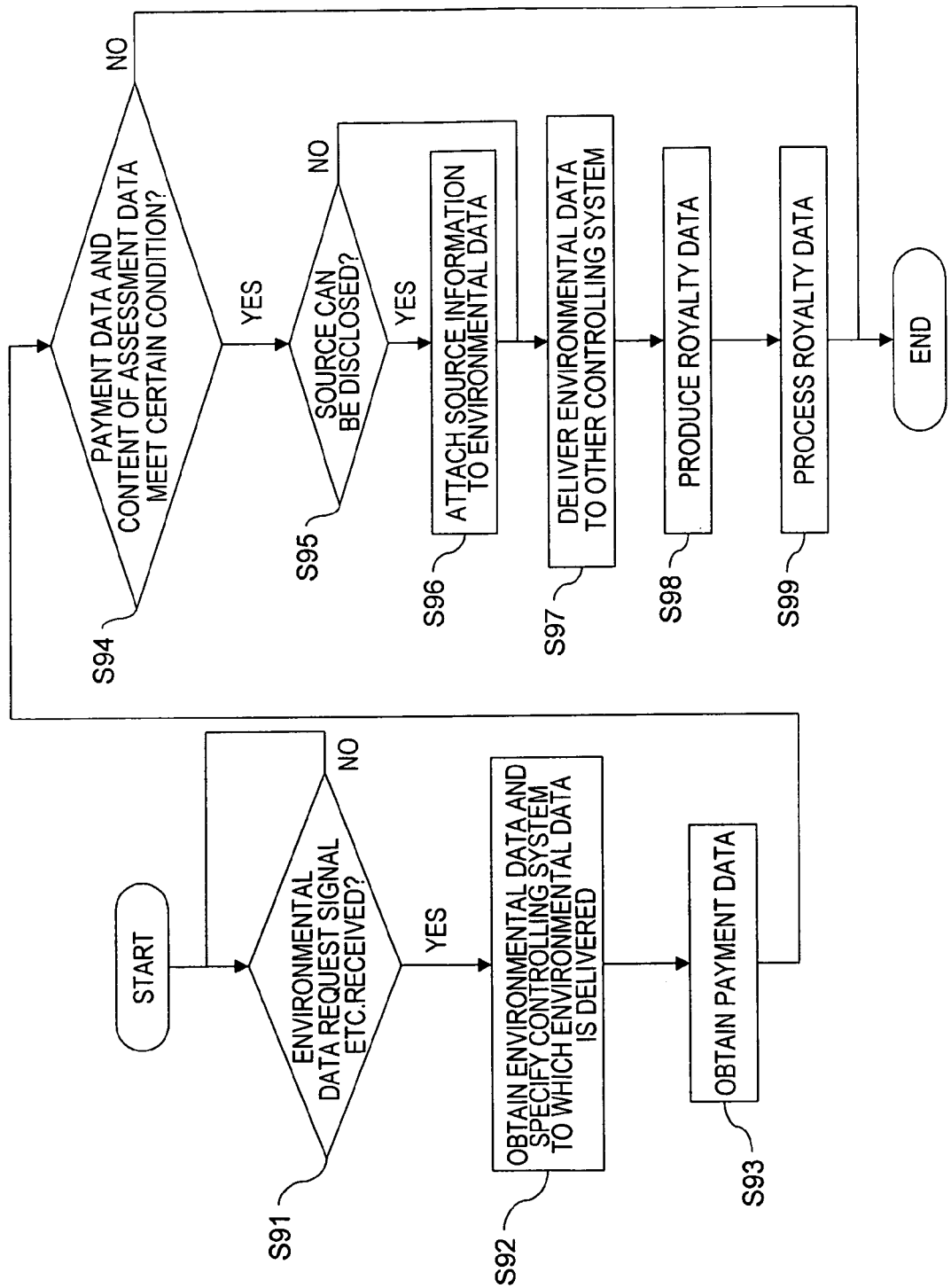
FIG. 27 is a performance flow showing a performance of the controlling system of the embodiment.

More specifically, the LED therapeutic device X comprises, as shown in FIG. 20, FIG. 21 and FIG. 22, one or multiple LEDs 51, a transparent solid pyramidal body 52 arranged in front of the LEDs 51, and a casing 53 that accommodates the LEDs 51 and the pyramidal body 52, and produces a therapeutic effect such as promoting a hypnagogic state, mitigating pain or stiffness, healing, or the like in a subject M bathed in the light irradiated externally from the LEDs 51 through the pyramidal body 52. The LEDs 51 are, for example, bullet-shaped ones at least including one that irradiates light blue or blue-green (wavelength of about 450 nm~about 500 nm) and arranged in multiple colors on a circular substrate 54. The LEDs 51 may be in a single color. The pyramidal body 52 is solid in a six-sided pyramid shape made of, for example, crystal or artificial crystal and arranged with its bottom face located in front of the LEDs 51. The casing 53 is, for example, in a hollow cylindrical shape with its front half part 531 made of a transparent resin, and its rear half part 532 made of metal. The LEDs 51, the substrate 54 and the pyramidal body 52 are accommodated inside of the casing 53, a front end face of the casing 53 is covered with a cap 55 made of a soft and translucent resin, and the light irradiated from the LEDs 51 is exited out from the front end face through the pyramidal body 52.

The state measuring means Z is an electroencephalograph, a clinical thermometer, a heart rate measuring instrument, a skin resistance meter and so on, each of which measures a state of the subject M, more concretely, brain waves, a body temperature, a heart rate, a skin resistance and so on, respectively.

Since the controlling system P2 and the central information processing device P3 have generally the same configuration as those of the former embodiment, a detailed explanation will be omitted. In this embodiment, a measured environmental data receiving part is not arranged in the controlling system P2 in compliance with an arrangement wherein an environment measuring means is not arranged.

<Explanation of System Operation>

Next, an example of an operation of a system for collecting data pertaining to conditions of promoting growth or health of living organisms will be explained with reference to flow charts shown in FIG. 23 through FIG. 27.

First, in one controlling system P2, when each controlling value concerning a therapeutic environment is input, the environmental data receiving part 21 receives the controlling value as being the environmental data by converting its controlling value appropriately (Step S51). The environmental data, whose one example is shown in FIG. 28, includes at least data concerning a state of light emission of the LEDs, namely light intensity, light emission pattern (PWM rate or the like), light emission spectrum (quantity of light intensity for each color of emitted LED) and also includes data showing a part of a subject to which the light is irradiated, a period of time while the light is irradiated or the like. Especially in this embodiment, the environmental data receiving part 21 is provided with a function to also receive a voice input such as music or Buddhist Supra as a controlling value and when the voice input is input, the environmental data receiving part 21 produces an environmental data to change the light emission state of the LEDs 51 in accordance with at least one of the strong or weak, the tone and the tone interval of the voice. Each controlling value may be input newly, or the fundamental environmental data or the environmental data that has already developed by the another controlling systems P2 may be loaded and based on this, an altered value may be input. At this time, each controlled value can be set to change sequentially in accordance with time or a cured state, if necessary.

Next, the control means controlling part 22 controls the environment by driving and controlling the LED therapeutic device X (Step S52).

As mentioned above, the therapeutic environment, namely the state of the light emission is controlled and treatment is to be conducted to the subject M, wherein the environmental data is administered by the environmental data administrating part 29 at the controlling system P2 (Step S53).

Next, when the environmental data is requested to transmit by the information processing system P3 (Step S54), the transmission controlling part 27 digitally certificates the information processing system P3 so as to judge the certified information processing system P3 (Step S55). If the information processing system P3 is the certified information processing system P3, the environmental data is allowed to be transmitted by the environmental data transmitting part 23 (Step S56). In addition, a content of information concerning the permission to disclose the source is set either one of, for example, the source can be disclosed or the source can not be disclosed, based on a content input by the operator (Step S57). A size of the information may be switched in a multistage form.

When the transmission is allowed by the transmission controlling part 27, the environmental data transmitting part 23 obtains the environmental data from the environmental data administrating part 32 and transmits the environmental data to the information processing system P3 in relationship to the identifier of the one controlling system P2 and the information concerning the permission to disclose the source (Step S58).

At the same time, the state data receiving part 25 receives the state data as being data concerning a curing state (Step S61). The state data receiving part 25 receives brain waves, a body temperature, a heart rate, a skin resistance of the subject M measured by the state measuring means Z as state data and an input such as an observation of a doctor or a view of the subject M himself or herself as state data as well (one example is shown in FIG. 29).

The state data received by the state data receiving part 25 is administered by the state data administrating part 29 at a side of the controlling system P2 (Step S62), the state data transmitting part 26 obtains the state data from the state data administrating part 36 at a predetermined timing and transmits the state data to the information processing system P3 in relationship to the identifier of the controlling system P2 and the identifier (environmental data name) of the corresponding environmental data (Step S63). The predetermined timing can be set variously by an operator such as a certain interval, at a time of completion of the treatment, or an external input.

Meanwhile, in the central information processing system P3, the environmental data receiving part 31 receives the environmental data produced and transmitted by the one controlling system P2 and each data attached thereto (Step S71).

The received environmental data and each data attached thereto are accumulated in the environmental data storing part D3 in a predetermined format so that the environmental data administrating part 32 administers it (Step S72).

Meanwhile, the state data receiving part 35 receives the state data transmitted by the one controlling system P2 together with the controlling system identifier of the one controlling system P2 and the identifier of the corresponding environmental data (Step S73).

Then the state data administrating part 36 administers the received state data or the like (Step S74).

The environmental data and the state data are not necessarily administered separately as shown in FIG. 30, however, may be administered in common.

Next, the assessment data obtaining part 39 obtains assessment data showing assessment concerning uniqueness and effectiveness of the received environmental data administered by the environmental data administrating part 32 from the assessment data storing part D5 (Step S75). The assessment data concerning uniqueness is automatically produced by comparing the data with data that has been transmitted and that is stored in the environmental data storing part D3. The assessment data concerning effectiveness is produced by actually treating a subject with the assessment data and verifying its effect and then inputting the result by an operator or receiving a report on this from another controlling system.

Since an effect of, for example, "healing" or the like is not obtained clearly from a numerical value such as a brain wave or the like, the effect is difficult to verify. In such a case, in producing the assessment data, uniqueness only may be considered, or other assessment criterion such as artistry, aesthetical view or the like may be used.

Next, in case that the assessment data meets a certain condition, namely in case that a content of the assessment data is "with uniqueness" and "with effectiveness" in this embodiment, the state data distributing part 37 distributes a part or all of the state data administered by the state data administrating part 36 to the another controlling system P2 (Step S76). The state data is in principle distributed to all of the other controlling systems P2. In addition, the value amount data distributing part 312 distributes a value amount data showing a value amount necessary to distribute the corresponding environmental data to the another controlling system P2 (Step S77).

At the another controlling system P2 that has received the delivered state data and the value amount data (Step S81), contents of the state data and the value amount data are displayed on a display (Step S82). The state data is displayed, for example, in a brain waveform. Meanwhile, a value amount corresponding to download or upload of a requested environmental data is also displayed based on the value amount data. At this time, items relating to the environmental data are not displayed at all. When an environmental data corresponding to requested state data is selected and a request to deliver the data is input (Step S83), the environmental data request signal is transmitted to the information processing system P3 together with the requested environmental data identifier and an identifier of the another controlling system P2 (Step S84).

When the environmental data request signal is received by a side of the information processing system P3 (Step S91), the environmental data distributing part 33 obtains the corresponding environmental data based on an environmental data identifier attached thereto from the environmental data administrating part 32 and specifies the another controlling system P2 to deliver the environmental data based on the controlling system identifier (Step S92).

At this time, the payment data obtaining part 38 automatically obtains payment data concerning payment of the value or guarantee of payment for the delivery from, for example, account data from financial institutions in relationship to the controlling system identifier that requests the environmental data (Step S93).

If the payment data obtaining part 38 obtains effective payment data and a content of the assessment data is "with uniqueness" and "with effectiveness" (Step S94), the environmental data distributing part 33 distributes the environmental data to the another controlling system P2 (Step S95). At this time, a content of the information concerning the permission to disclose the source is judged (Step S96), and if the content is that the source can be disclosed, source information (for example, an identifier of the one controlling system P2) suggesting its source of the environmental data is attached to the environmental data (Step S97).

As mentioned above, if the environmental data is distributed or is in a state that the environmental data is definitely to be distributed, the royalty data producing part 34 produces royalty data concerning royalty in relationship to the controlling system identifier that identifies the one controlling system P2 (Step S98).

Then the royalty data processing part 310 processes a variety of processes such that the royalty data is transmitted to financial institutions or its content is output in printing (Step S99).

As mentioned above, royalty is paid to a person who has created and disclosed an original and effective light therapeutic environment by making use of the LED therapeutic device X and the controlling system P2.

The present claimed invention is not limited to the above-mentioned embodiments. For example, an environment to be controlled may include at least irradiated light and other environment may be variously modified or added.

Any environmental data may be downloaded or uploaded freely as far as a member who uses this controlling system pays a predetermined amount of money.

In addition, if the produced environmental data is transmitted to the central information processing system or the effective assessment data is obtained, the royalty may be paid. The royalty is not necessarily money, lease charge and may be withheld in case that a program is leased for, for example, a plant culturing device or a controlling system P2.

Other arrangement may be variously modified without departing from the spirit of the invention.

POSSIBLE APPLICATIONS IN INDUSTRY

As mentioned above, in accordance with the present claimed invention, since royalty fees are paid to a person or enterprise that has discovered or developed effective environmental data, it is possible to collect environmental data such as is used in the culturing of living organisms that conventionally tends to be held in secret, since a profitable return for effort expended can be reasonably expected.

In addition, since the proposed invention provides a sense of security that a royalty of some kind will be paid, a large number participants engaged in the development of such valuable environmental data can be attracted, and a result of this, rapid development can be expected even though this type of environmental data has a large number of parameters and requires significant work to perfect. The administrative robustness of the system promotes the reuse of the developed environmental data, which further facilitates data development and shortens the development time.

More specifically, it is possible to promote, for example, the large-scale industrialization of agricultural industry or the like in a brief period of time with ease by making use of thus developed environmental data, thereby enabling the solution of food supply deficiencies or health care problems with practices not heretofore seen conventionally.

The invention claimed is:

1. A condition data collecting system for promoting a growth or health of living organisms through the collective efforts of a plurality of separate and independent research sources that can each collaboratively perform research with a separate controlling system comprising:

multiple separate controlling systems, that can each promote a growth or health of living organisms by controlling at least a light irradiated on the living organisms, each controlling system being a separate and independent research source that collaboratively is interconnected to perform research on a common research project and an information processing system that is communicably connected with each of the separate controlling systems to enable the collaborative research to be distributed to each of the multiple separate controlling systems, wherein the each of the multiple controlling systems includes an environment controlling unit including at least a light irradiating unit for providing light of a characteristic to promote growth of a specific living organism, the information processing system includes an environmental data receiving part that receives relevant environmental data which is data concerning an environment of the living organism including data on the light which will promote a growth or health of the living organism received from at least a first controlling system to enable an advancement of collaborative research information;

an environmental data administrating part that administers the environmental data received by the environmental data receiving part to provide a communicable format of environmental data that can be distributed by the information processing systems to the other separate controlling systems;

an environmental data delivering part that obtains the environmental data administered by the environmental data administrating part and delivers the environmental data at least from the first controlling system to a second controlling system in the multiple separate controlling systems when the environmental data delivering part receives an environmental data request signal from the second controlling system to deliver the environmental data from the first controlling system to the second controlling system;

a royalty data producing part that produces royalty data to determine a value to be received in return for disclosing the environmental data originally produced by any of the multiple separate controlling systems including the first controlling system to any of the multiple separate controlling systems including the second controlling system, in relationship to a controlling system identifier that identifies one of the controlling systems when the environmental data is received or delivered;

a state data receiving part that receives state data including image data of living organisms and a state of a midstream process;

a state data administrating part that administers the state data received by the state data receiving part;

a state data delivering part that delivers a part or all of the state data administered by the state data administrating part to the at least second controlling system; and an assessment data obtaining part that obtains the assessment data showing an assessment of an effectiveness and uniqueness of the environmental data administered by the environmental data administrating part, wherein the royalty data producing part produces the royalty data which is based on a content of the assessment data obtained by the assessment data obtaining part to determine a royalty value for the data, wherein each of the multiple separate controlling systems can deliver and/or receive data that promotes a growth or health of a living organism in return for a royalty payment from the information processing system.

2. The condition data collecting system of claim 1 wherein the information processing system further includes:

a payment data obtaining part that obtains payment data concerning payment or a guarantee of payment in compensation for the environmental data delivered in accordance with a controlling system identifier that identifies the second controlling system requesting the environmental data, wherein the environmental data delivering part obtains the environmental data from the environmental data administrating part and delivers the environmental data to the other controlling system identified by the controlling system identifier provided that the payment data obtaining part has obtained the payment data; and the royalty data producing part produces the royalty data in relationship to the controlling system identifier of the first controlling system provided that the payment data obtaining part has obtained the payment data.

3. The condition data collecting system of claim 1 wherein the royalty data producing part produces the royalty data in accordance with the specific environmental datum or data delivered by the environmental data delivering part.

4. The condition data collecting system of claim 1 wherein the royalty data producing part produces the royalty data in accordance with an amount of environmental data used.

5. The condition data collecting system of claim 1 wherein the information processing system further includes:

an assessment data obtaining part that obtains assessment data showing an assessment of uniqueness or effectiveness of the environmental data administered by the environmental data administrating part, wherein the environmental data delivering part delivers the environmental data provided that contents of the assessment data obtained by the assessment data obtaining part meets a predetermined requirement.

6. The condition data collecting system of claim 1 wherein the environmental data delivering part delivers source information indicating the first controlling system as being the source of the environmental data, with this information being attached to the environmental data delivered to the other controlling system only when the content of the information concerning the permission to disclose the source, which is received from the first controlling system, is designated to be disclosed.

7. The condition data collecting system of claim 1 wherein the state data includes image data obtained by a camera imaging the relevant living organism.

8. The condition data collecting system of claim 1 wherein the state data delivering part delivers the camera image data included in the state data in the form of sequential images of the living organism.

9. The condition data collecting system of claim 1 wherein the information processing system further includes:
- a fundamental environmental data storing part that stores a fundamental environmental datum or data in advance; and
- a fundamental environmental data delivering part that delivers the fundamental environmental data to each of the multiple controlling systems relative to a common living organism identified by an identifier data.

10. The condition data collecting system of claim 1 wherein the living organism is a plant.

11. The condition data collecting system of claim 1 wherein the controlling system includes:
- a request signal transmitting part that transmits a request signal to the information processing system requesting delivery of environmental data that is specified by an environmental data identifier;
- an environmental data receiving part that receives the environmental data delivered by the information processing system; and
- a control means controlling part that controls one or multiple environment control means to control the environment of the living organism, based on the environmental data.

12. The condition data collecting system of claim 9 wherein the controlling system further includes:
- an environment measuring means that measures values of the environment of the living organism including humidity, $Co_2$ and temperature;
- a measured environmental data receiving part that receives measured environmental data indicating measured values of the environment of the living organism from the environment measuring means that measures the relevant environment.

13. The condition data collecting system of claim 1 wherein the controlling system further includes:
- a living organism state measuring means that measures the state of growth or health of living organisms including camera images;
- a state data receiving part that receives state data as being data concerning the growth or health of the living organism from the living organism state measuring means; and
- a state data transmitting part that transmits the state data received by the state data receiving part to the information processing system.

14. The condition data collecting system of claim 13 wherein the living organism state measuring means comprises an imaging means that images a part or all of the living organism.

15. The condition data collecting system of claim 14 wherein the environmental data delivered by the information processing system is so arranged as to be incapable of being copied externally and further includes a judgment unit to determine if the source of the environmental data can be disclosed.

16. The condition data collecting system of claim 1 wherein the light irradiating means comprises an arrangement multiple LEDs of at least one red LED, blue LED, green LED, white LED, infrared LED, and ultraviolet LED or any combination thereof.

17. The condition data collecting system of claim 1 wherein
- the environmental data transmitting part transmits information concerning the permission to disclose the source information, that indicates which controlling system the environmental data is delivered from, in order to judge whether or not the source information is to be attached when the environmental data is delivered from the information processing system to the other controlling system.

18. The condition data collecting system of claim 1 wherein the environment controlling means further includes a temperature controlling means including a heater or a window open-close mechanism.

* * * * *